(12) United States Patent
Bella et al.

(10) Patent No.: US 12,353,596 B2
(45) Date of Patent: *Jul. 8, 2025

(54) SYSTEM, METHOD, AND COMPUTER PROGRAM PRODUCT FOR CONSENT MANAGEMENT

(71) Applicant: Visa International Service Association, San Francisco, CA (US)

(72) Inventors: Kimberly E. Bella, Walnut Creek, CA (US); Nirmal Kumar Baid, San Jose, CA (US); Robert B. Hedges, Jr., Orford, NH (US); David Alan Henstock, San Francisco, CA (US); Shashi Kumar Velur, Austin, TX (US); Sonia Gupta, Pleasanton, CA (US); Cindy Hong, Palo Alto, CA (US); Jonathan Twichell, Cedar Park, TX (US)

(73) Assignee: Visa International Service Association, San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/438,885

(22) Filed: Feb. 12, 2024

(65) Prior Publication Data

US 2024/0184916 A1 Jun. 6, 2024

Related U.S. Application Data

(63) Continuation of application No. 18/029,701, filed as application No. PCT/US2022/042136 on Aug. 31, 2022.

(Continued)

(51) Int. Cl.
*G06F 21/62* (2013.01)
*G06F 16/23* (2019.01)

(52) U.S. Cl.
CPC ...... *G06F 21/6245* (2013.01); *G06F 16/2379* (2019.01)

(58) Field of Classification Search
CPC ............. G06F 21/6245; G06F 16/2379; G06F 21/6218; G06F 21/64; H04L 63/105;
(Continued)

(56) References Cited

U.S. PATENT DOCUMENTS 9,635,000 B1 * 4/2017 Muftic ................. H04L 9/3239
11,568,401 B2 * 1/2023 Shah ..................... G06Q 40/00
(Continued)

OTHER PUBLICATIONS

Truong et al., "GDPR-Compliant Personal Data Management: A Blockchain-Based Solution", IEEE Transactions on Information Forensics and Security, 2020, pp. 1746-1761, vol. 15.

*Primary Examiner* — Catherine Thiaw
*Assistant Examiner* — Nega Woldemariam
(74) *Attorney, Agent, or Firm* — The Webb Law Firm

(57) ABSTRACT

A system, method, and computer program product are provided for consent management. A method may include receiving a first data request for user data associated with a user, the user data stored in a user data database; communicating a consent request to the requester system; receiving a consent response from the requester system; storing consent data associated with the consent response for the user data requested in the first data request in an immutable ledger; receiving a consent verification request from the user data database, the consent verification request based on a second data request for the user data from the requester system to the user data database; verifying the consent verification request based on the consent data; and communicating a consent verification response to the user data database, the consent verification response indicating consent from the user to share the user data with the requester system.

18 Claims, 16 Drawing Sheets

Related U.S. Application Data

(60) Provisional application No. 63/314,744, filed on Feb. 28, 2022, provisional application No. 63/238,945, filed on Aug. 31, 2021.

(58) Field of Classification Search
CPC ........... H04L 63/12; H04L 9/50; H04L 63/10; H04W 12/084; H04W 12/10
USPC ............................................................ 726/1
See application file for complete search history.

(56) References Cited

U.S. PATENT DOCUMENTS

| | | | |
|---|---|---|---|
| 2004/0153908 A1* | 8/2004 | Schiavone | G06F 21/6245 |
| | | | 714/712 |
| 2019/0188411 A1 | 6/2019 | Kroutik | |
| 2019/0348158 A1 | 11/2019 | Livesay et al. | |
| 2019/0392162 A1* | 12/2019 | Stern | G06F 21/6245 |
| 2020/0356695 A1* | 11/2020 | Brannon | G06F 16/2379 |
| 2020/0364356 A1 | 11/2020 | Yan et al. | |
| 2020/0364358 A1* | 11/2020 | Karia | G06Q 20/3829 |
| 2020/0364705 A1* | 11/2020 | Yadav | H04L 9/0825 |
| 2021/0042294 A1 | 2/2021 | Srivastava | |
| 2021/0099313 A1 | 4/2021 | Kondrashov et al. | |
| 2021/0174911 A1 | 6/2021 | Sharda et al. | |
| 2021/0390196 A1* | 12/2021 | Lavine | H04L 63/102 |
| 2022/0198057 A1* | 6/2022 | Johnston | G06F 21/6245 |
| 2022/0217539 A1* | 7/2022 | Khare | H04W 8/18 |
| 2022/0300999 A1* | 9/2022 | Ortiz | H04L 63/10 |
| 2022/0335156 A1* | 10/2022 | Raphael | G06F 16/25 |

\* cited by examiner

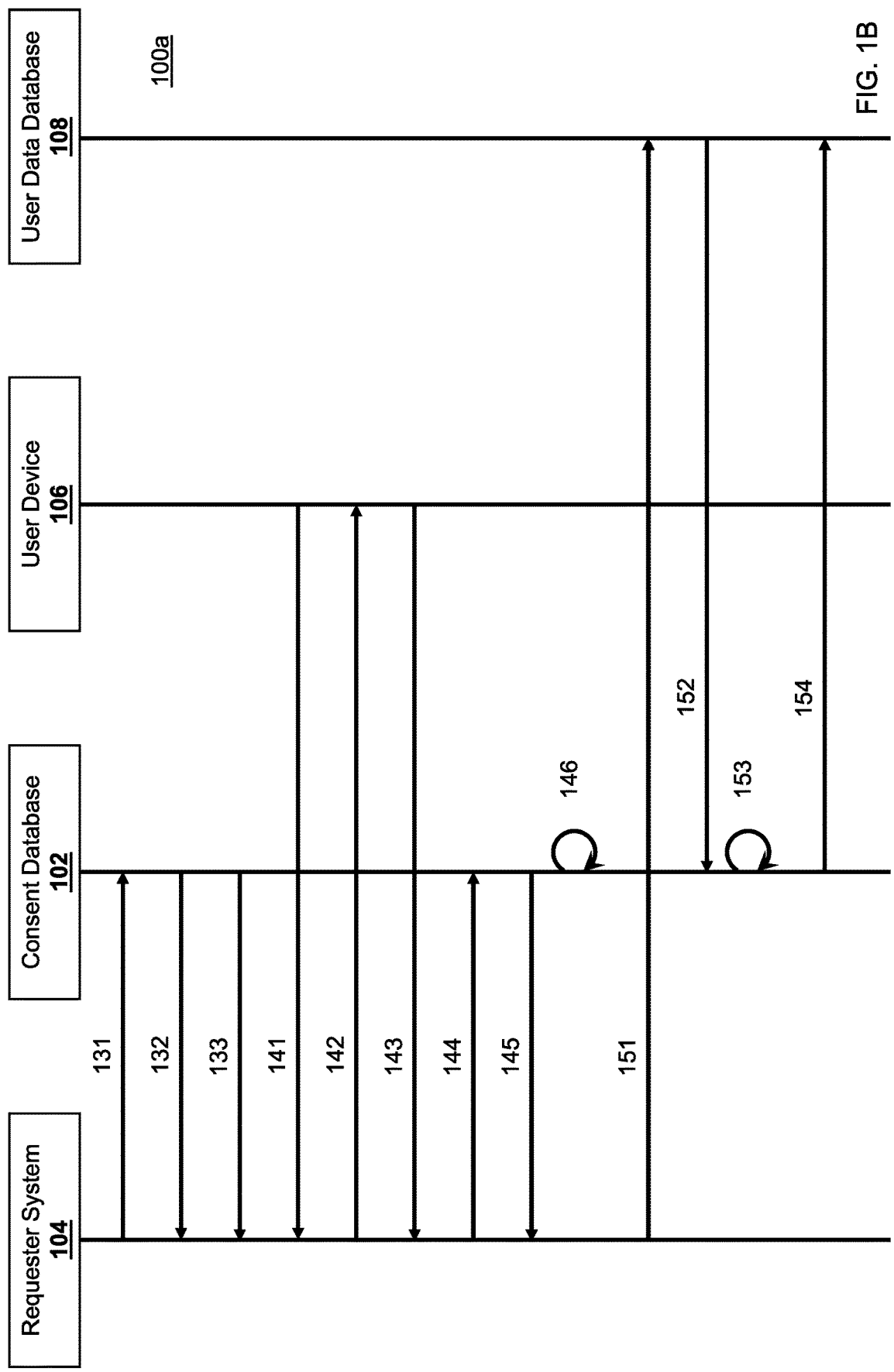

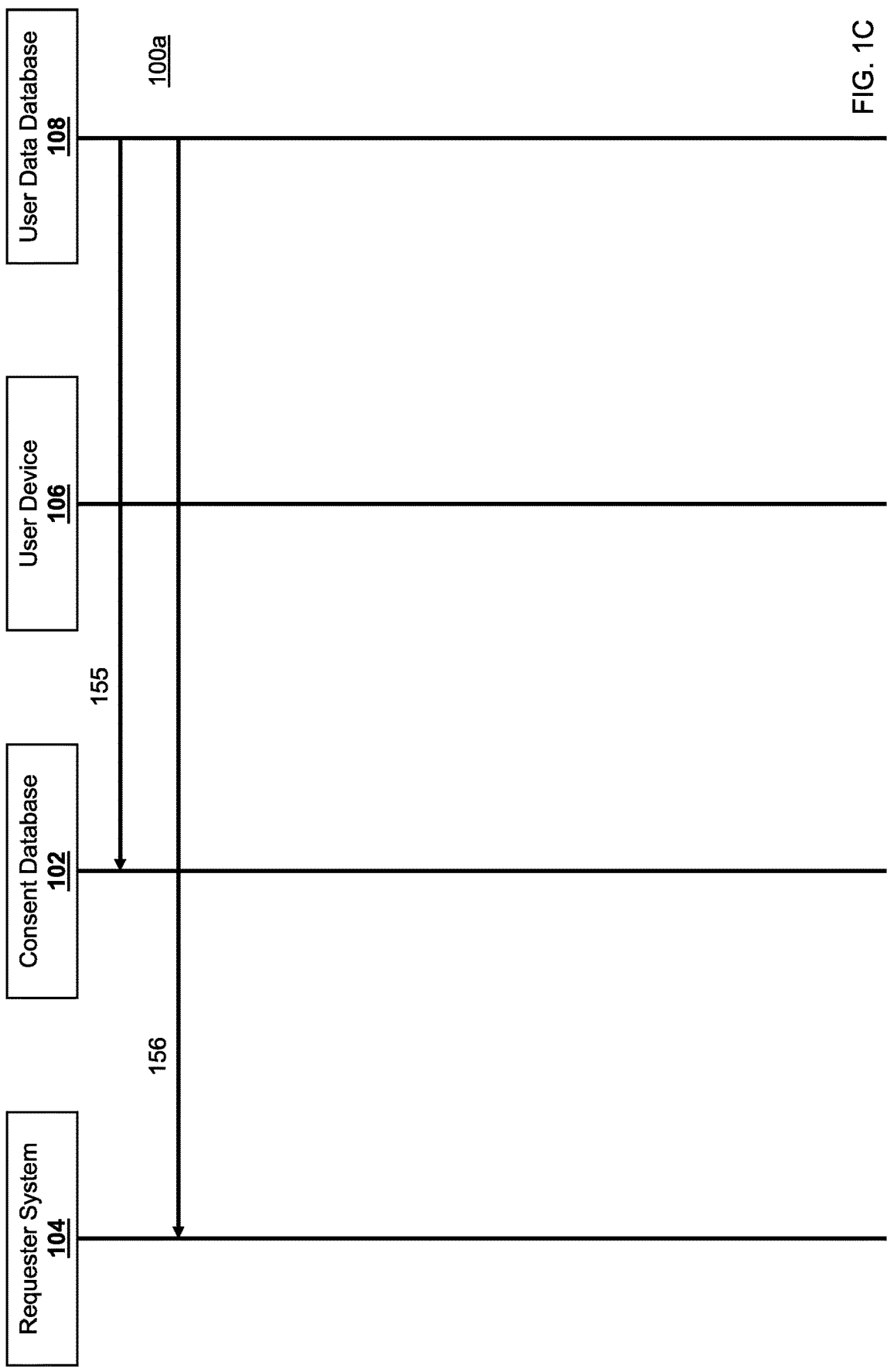

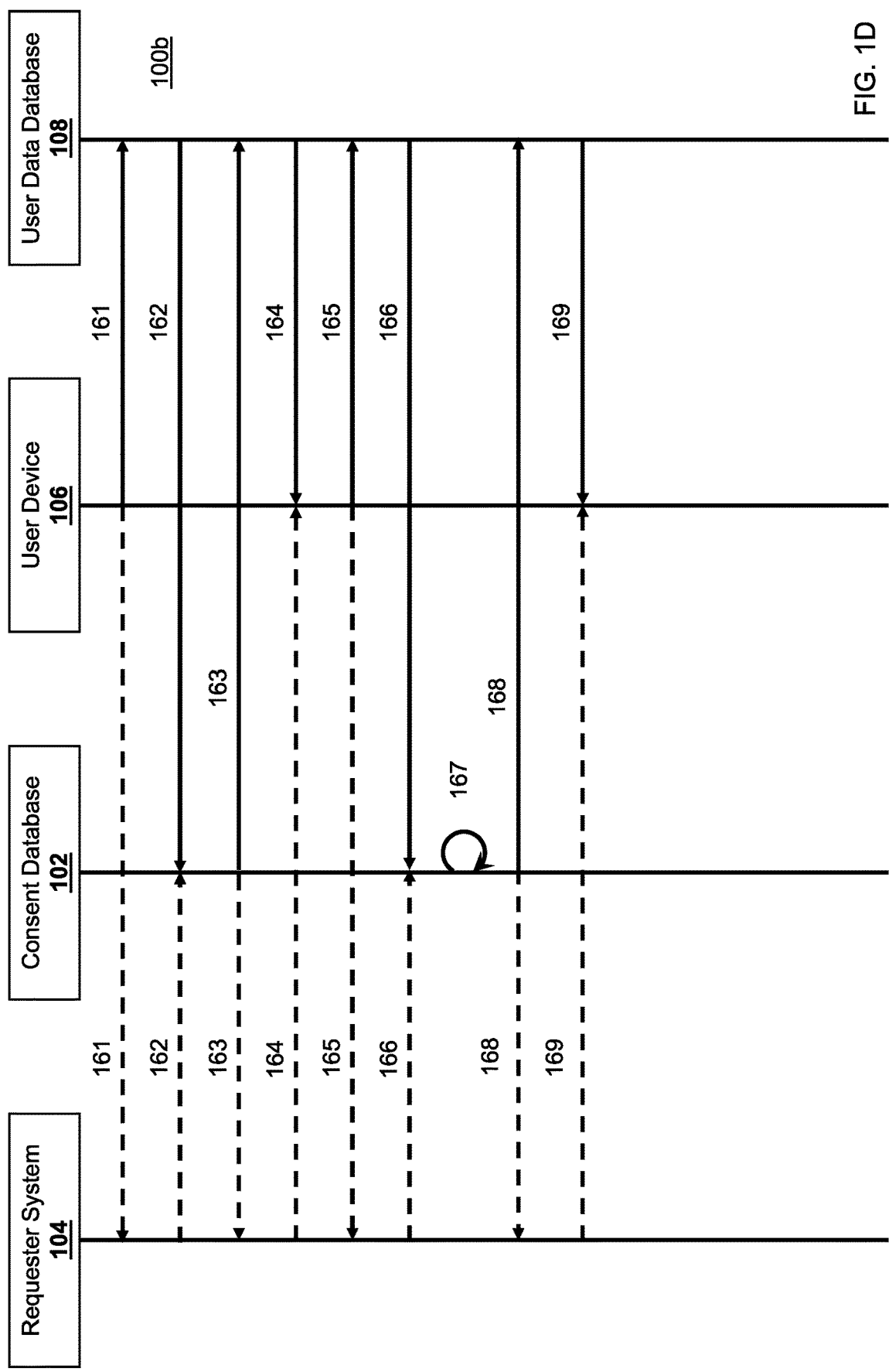

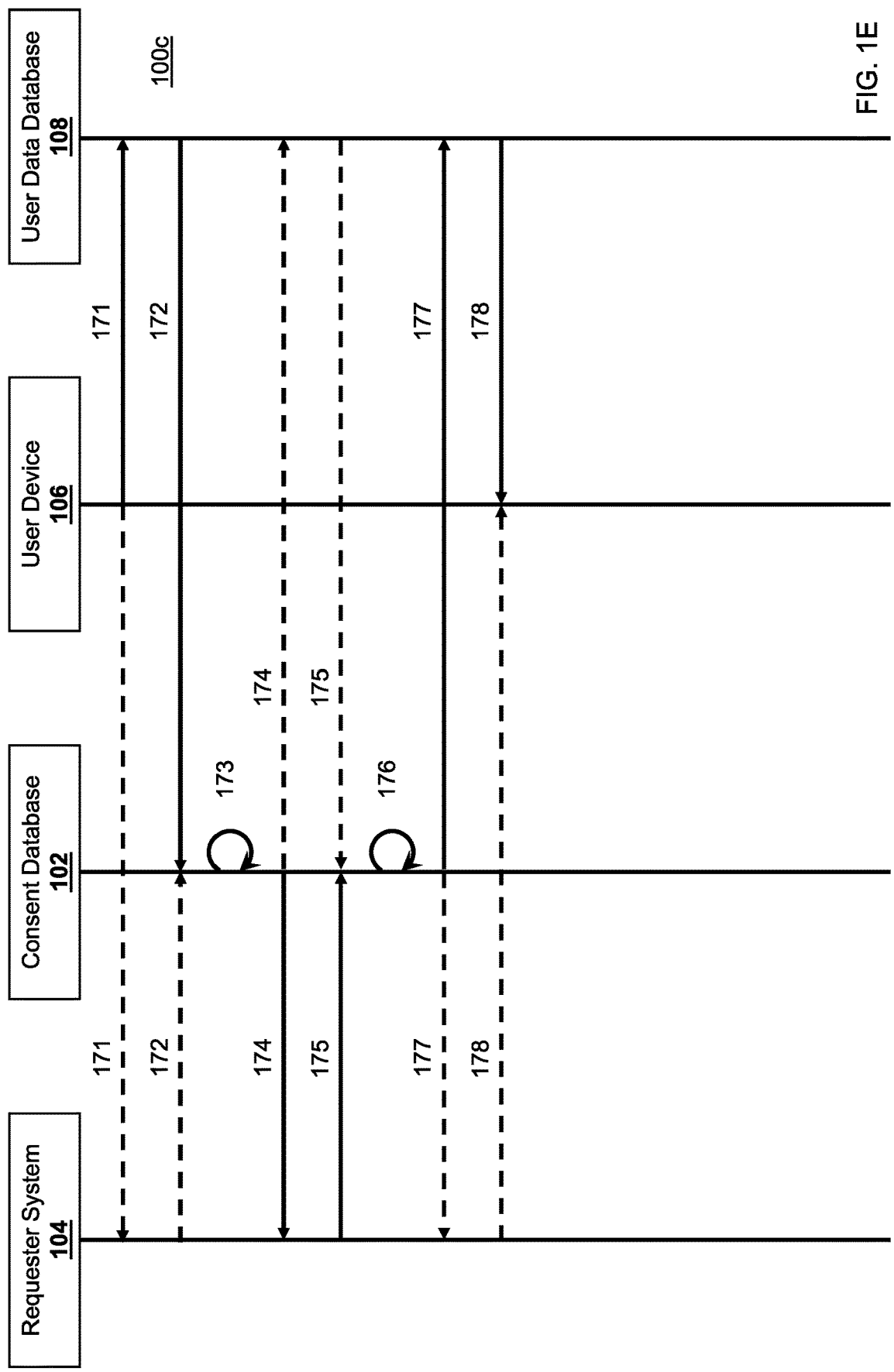

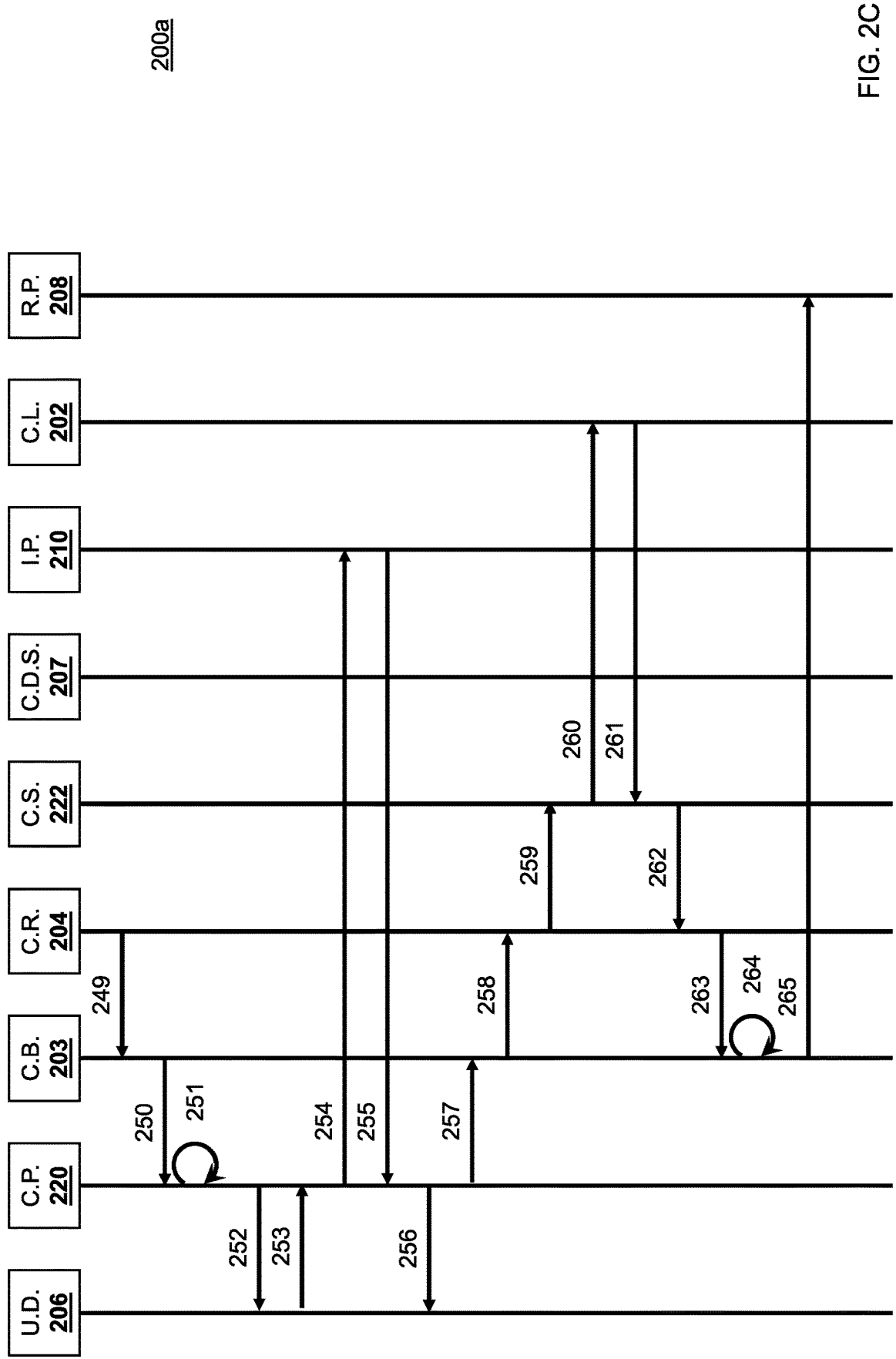

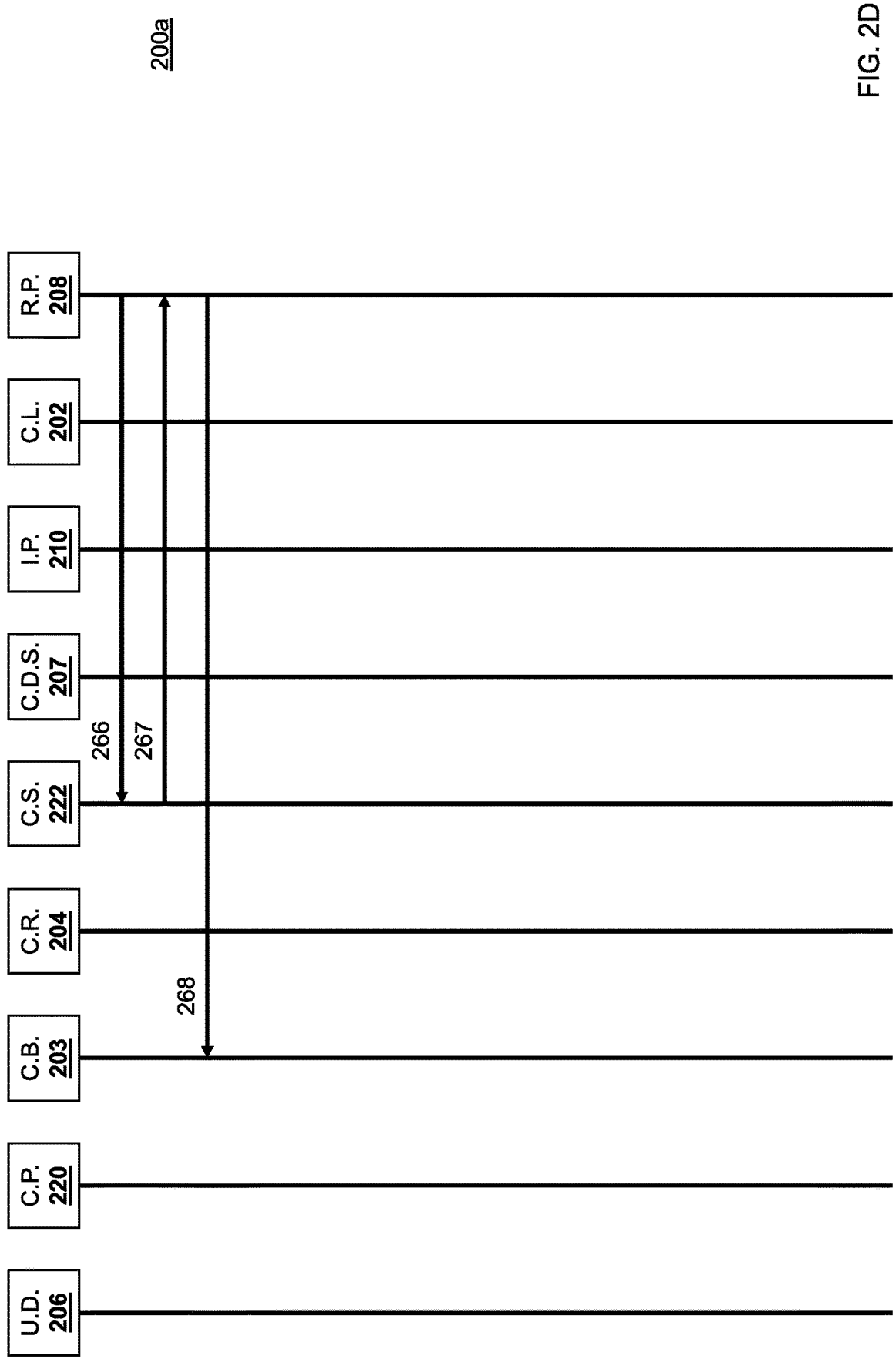

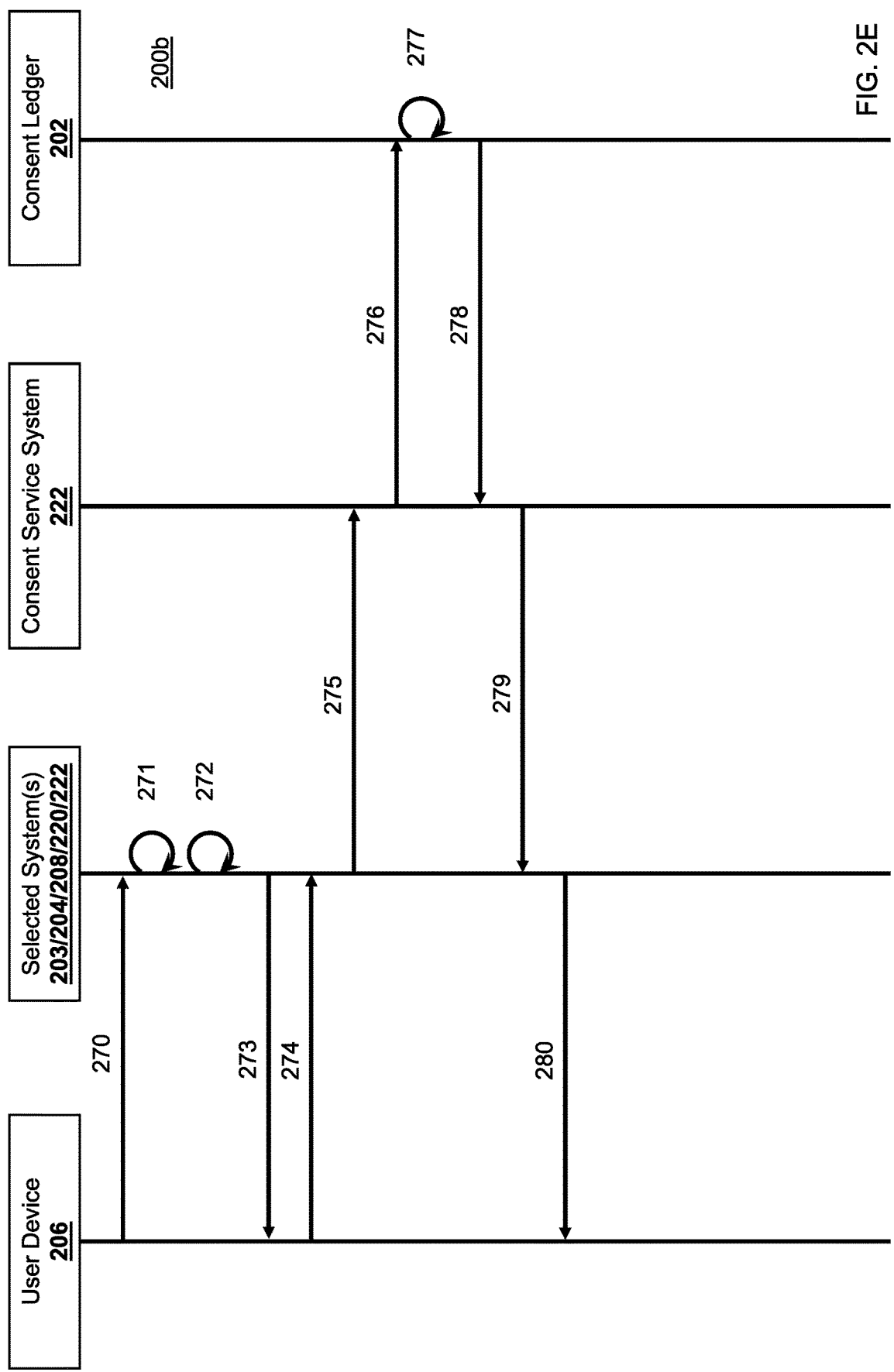

SYSTEM, METHOD, AND COMPUTER PROGRAM PRODUCT FOR CONSENT MANAGEMENT

CROSS-REFERENCE TO RELATED APPLICATIONS

This application is a continuation of U.S. patent application Ser. No. 18/029,701, filed Aug. 31, 2022, which is the United States national phase of International Application No. PCT/US2022/042136, filed Aug. 31, 2022, and claims the benefit of U.S. Provisional Patent Application No. 63/238,945, filed Aug. 31, 2021, and 63/314,744, filed Feb. 28, 2022, the disclosures of which are hereby incorporated by reference in their entirety.

BACKGROUND

1. Technical Field

The present disclosure relates to managing consent for sharing and/or using user data and/or taking an action on behalf of a user and, in non-limiting embodiments or aspects, to a system, method, and computer program product for managing consent for sharing and/or using user data and/or taking an action on behalf of a user through an automated consent platform.

2. Technical Considerations

In recent years, there has been a growing concern over the misuse of a user's personal data. Several new laws have been enacted through the world to provide users with increased oversight in how their data is used. However, an increased burden is being put on users themselves as they grant permissions to individual websites with little ability to verify how their data is being used or to easily change where, how, and by whom their data is being used. Additionally, each individual data holder (e.g., resource provider, website, or the like) must store and keep track of the permissions granted to it by each user. Therefore, there is a need for a way to consolidate permissions to improve efficiency, reduce redundancy and/or utilization of computing resources, increase security of the user data, allow for review and/or auditing of the consents granted, enable revision of consents, promote uniformity, and enable traceability of data use.

SUMMARY

According to some non-limiting embodiments or aspects, provided is a method including receiving, by a consent database, a first data request for user data associated with a user from a requester system, the user data stored in a user data database separate from the consent database; communicating, by the consent database, a consent request to the requester system for display to the user on a user device associated with the user; receiving, by the consent database, a consent response from the requester system based on input from the user device, the consent response indicating consent from the user to share the user data requested in the first data request; storing, by the consent database, consent data associated with the consent response for the user data requested in the first data request in an immutable ledger; receiving, by the consent database, a consent verification request from the user data database, the consent verification request based on a second data request for the user data from the requester system to the user data database; verifying, by the consent database, the consent verification request based on the consent data stored in the immutable ledger; and communicating, by the consent database, a consent verification response based on verifying the consent verification request to the user data database, the consent verification response indicating consent from the user to share the user data from the user data database with the requester system.

In some non-limiting embodiments or aspects, the method may further include receiving, by the consent database, from the requester system, utilization data associated with consented use of user data, and storing, by the consent database, the utilization data associated with the user data in the immutable ledger. The method may further include receiving, by the consent database, from the user data database, distribution data associated with a data access of the user data from the requester system, and storing, by the consent database, the distribution data associated with the user data in the immutable ledger. The method may also further include comparing, by the consent database, the distribution data associated with the user data with the consent data associated with the user data; determining, by the consent database, compliance of the distribution data to conditions of the consent data; and storing, by the consent database, an indication of compliance of the distribution data in the immutable ledger.

In some non-limiting embodiments or aspects, the method may further include comparing, by the consent database, the utilization data associated with the user data with the consent data associated with the user data, determining, by the consent database, compliance of the utilization data to conditions of the consent data, and storing, by the consent database, an indication of compliance of the utilization data in the immutable ledger. The method may further include receiving, by the consent database, an audit request associated with the user data from the user data database, and communicating, by the consent database, the indication of compliance of the utilization data associated with the user data to the user data database.

In some non-limiting embodiments or aspects, the method may further include receiving, by the consent database, a revocation request of a consent associated with the user data from the user device, updating, by the consent database, the consent response based on the revocation request, and communicating, by the consent database, the updated consent response to the user data database.

According to non-limiting embodiments or aspects, provided is a system for managing consent, the system including at least one server computer including at least one processor, the at least one server computer programmed and/or configured to receive a first data request for user data associated with a user from a requester system, the user data stored in a user data database separate from a consent database, communicate a consent request to the requester system for display to the user on a user device associated with the user, receive a consent response from the requester system based on input from the user device, the consent response indicating consent from the user to share the user data requested in the first data request, store consent data associated with the consent response for the user data requested in the first data request in an immutable ledger, receive a consent verification request from the user data database, the consent verification request based on a second data request for the user data from the requester system to the user data database, verify the consent verification request based on the consent data stored in the immutable ledger, and communicate a consent verification response based on verifying the consent verification request to the user data database, the consent verification response indicating consent from the user to share the user data from the user data database with the requester system.

In some non-limiting embodiments or aspects, the at least one server computer is programmed and/or configured to receive from the requester system, utilization data associated with consented use of user data, and store the utilization data associated with the user data in the immutable ledger. The at least one server computer may be programmed and/or configured to receive from the user data database, distribution data associated with a data access of the user data from the requester system, and store the distribution data associated with the user data in the immutable ledger. The at least one server computer may be programmed and/or configured to compare the distribution data associated with the user data with the consent data associated with the user data, determine compliance of the distribution data to conditions of the consent data, and store an indication of compliance of the distribution data in the immutable ledger.

In some non-limiting embodiments or aspects, the at least one server computer is programmed and/or configured to compare the utilization data associated with the user data with the consent data associated with the user data, determine compliance of the utilization data to conditions of the consent data, and store an indication of compliance of the utilization data in the immutable ledger. The at least one server computer may be programmed and/or configured to receive an audit request associated with the user data from the user data database, and communicate the indication of compliance of the utilization data associated with the user data to the user data database.

In some non-limiting embodiments or aspects, the at least one server computer may be programmed and/or configured to receive a revocation request of a consent associated with the user data from the user device, update the consent response based on the revocation request, and communicate the updated consent response to the user data database.

According to non-limiting embodiments or aspects, provided is a computer program product including at least one non-transitory computer-readable medium including one or more program instructions that, when executed by at least one processor, cause the at least one processor to receive a first data request for user data associated with a user from a requester system, the user data stored in a user data database separate from a consent database, communicate a consent request to the requester system for display to the user on a user device associated with the user, receive a consent response from the requester system based on input from the user device, the consent response indicating consent from the user to share the user data requested in the first data request, store consent data associated with the consent response for the user data requested in the first data request in an immutable ledger, receive a consent verification request from the user data database, the consent verification request based on a second data request for the user data from the requester system to the user data database, verify the consent verification request based on the consent data stored in the immutable ledger, and communicate a consent verification response based on verifying the consent verification request to the user data database, the consent verification response indicating consent from the user to share the user data from the user data database with the requester system.

In some non-limiting embodiments or aspects, the one or more program instructions further may cause the at least one processor to receive from the requester system, utilization data associated with consented use of user data, and store the utilization data associated with the user data in the immutable ledger. The one or more program instructions further may cause the at least one processor to receive from the user data database, distribution data associated with a data access of the user data from the requester system, and store the distribution data associated with the user data in the immutable ledger. The one or more program instructions may further cause the at least one processor to compare the distribution data associated with the user data with the consent data associated with the user data, determine compliance of the distribution data to conditions of the consent data, and store an indication of compliance of the distribution data in the immutable ledger.

In some non-limiting embodiments or aspects, the one or more program instructions further may cause the at least one processor to compare the utilization data associated with the user data with the consent data associated with the user data, determine compliance of the utilization data to conditions of the consent data, and store an indication of compliance of the utilization data in the immutable ledger. The one or more program instructions may further cause the at least one processor to receive an audit request associated with the user data from the user data database, and communicate the indication of compliance of the utilization data associated with the user data to the user data database.

According to non-limiting embodiments or aspects, provided is a computer-implemented method, including receiving, by a consent service system, a data request for user data associated with a user from a consent requester system, wherein the user data is stored in a resource provider system and wherein the data request includes a consent beneficiary system identification associated with a consent beneficiary system; receiving, by the consent service system, an identification token, wherein the identification token authenticates an identity of the user associated with the data request; communicating, by the consent service system, a consent token request to a consent ledger system, wherein the consent token request includes the identification token, the beneficiary system identification, and data associated with the data request; generating, by the consent ledger system, a consent token associated with the consent token request and the user; communicating, by the consent ledger system, the consent token to the consent requester system; receiving, by the resource provider system, the consent token; and communicating, by the resource provider system, user data associated with the consent token to the consent beneficiary system.

In some non-limiting embodiments or aspects, the consent requester system includes at least one of the consent beneficiary system, a consent presenter system, or any combination thereof.

In some non-limiting embodiments or aspects, a consent presenter system may receive a service request from a user via a graphical user interface displayed on a user device of the user. Additionally or alternatively, the consent presenter system may communicate the service request to the consent beneficiary system. Additionally or alternatively, the consent beneficiary system may communicate the data request to the consent requester system based on receiving the service request.

In some non-limiting embodiments or aspects, the data request includes at least one consent item associated with the user data, wherein each consent item of the at least one consent item includes at least one of: consent item type data associated with a type of the consent item; duration data associated a duration of the consent item; time range data associated a time range of the consent item; frequency data associated a frequency of how often the consent item will be requested; time span data associated with a time span of the consent item; consent state data associated with a state of the consent item; consent status data associated with a status of the consent item; primary purpose data associated with at least one primary purpose for which the consent item will be used; secondary purpose data associated with at least one secondary purpose for which the consent item will be use, the at least one secondary purpose different than the at least one primary purpose; or any combination thereof.

In some non-limiting embodiments or aspects, the consent service system may communicate the data request to a consent directory service system. Additionally or alternatively, the consent service system may receive resource provider identification data associated with at least one resource provider system storing the user data, the at least one resource provider system including the resource provider system. Additionally or alternatively, the consent service system may communicate the resource provider identification data to the consent requester system.

In some non-limiting embodiments or aspects, the consent service system may receive resource provider selection data associated with the resource provider system of the at least one resource provider system. Additionally or alternatively, the consent service system may communicate the resource provider selection data to the consent directory service system. Additionally or alternatively, the consent service system may receive identity provider identification data associated with at least one identity provider system authorized to authenticate the identity of the user. Additionally or alternatively, the consent service system may communicate the identity provider identification data to the consent requester system.

In some non-limiting embodiments or aspects, an identity provider system of the at least one identity provider system may generate the identification token based on receiving authentication data from the user.

In some non-limiting embodiments or aspects, the receiving the identification token may include receiving, by the consent service system, a consent request from the consent requester system. Additionally or alternatively, the consent request may include the identification token and at least one consent item associated with the user data. Additionally or alternatively, each consent item may include at least one of the beneficiary system identification, the data associated with the data request, or any combination thereof.

In some non-limiting embodiments or aspects, the communicating the consent token request may include communicating, by the consent service system, the consent request to the consent ledger system.

In some non-limiting embodiments or aspects, the generating the consent token may include generating, by the consent ledger system, the consent token based on the consent request. Additionally or alternatively, communicating the consent token to the consent requester system may include communicating, by the consent ledger system, the consent token to the consent service system and/or communicating, by the consent service system, the consent token to the consent requester system.

In some non-limiting embodiments or aspects, the consent requester system may communicate the consent token to the consent beneficiary system. Additionally or alternatively, the consent beneficiary system may store the consent token. Additionally or alternatively, the consent beneficiary system may communicate the consent token to the resource provider system.

In some non-limiting embodiments or aspects, the resource provider system may communicate a token validation request based on the consent token to the consent service system. Additionally or alternatively, the resource provider system may receive a token validation response indicating that the consent token is valid.

In some non-limiting embodiments or aspects, communicating the user data to the consent beneficiary system may include communicating, by the resource provider system, at least one consent value for each consent item of the at least one consent item. Additionally or alternatively, each consent value may include at least a portion of the user data.

According to non-limiting embodiments or aspects, provided is a system, including a resource provider system, a consent ledger system, and a consent service system. The consent service system may be configured to receive a data request for user data associated with a user from a consent requester system. The user data may be stored in a resource provider system. The data request may include a consent beneficiary system identification associated with a consent beneficiary system. The consent service system may be configured to receive an identification token. The identification token may authenticates an identity of the user associated with the data request. The consent service system may be configured to communicate a consent token request to a consent ledger system. The consent token request may include the identification token, the beneficiary system identification, and/or data associated with the data request. The consent ledger system may be configured to generate a consent token associated with the consent token request and the user. The consent ledger system may be configured to communicate the consent token to the consent requester system. The resource provider system may be configured to receive the consent token. The resource provider system may be configured to communicate the user data associated with the consent token to the consent beneficiary system.

According to non-limiting embodiments or aspects, provided is a computer program product including at least one non-transitory computer-readable medium including one or more instructions that, when executed by at least one processor, may cause the at least one processor to receive, by a consent service system, a data request for user data associated with a user from a consent requester system. The user data may be stored in a resource provider system. The data request may include a consent beneficiary system identification associated with a consent beneficiary system. The one or more instructions, when executed by the at least one processor, may cause the at least one processor to receive, by the consent service system, an identification token. The identification token may authenticate an identity of the user associated with the data request. The one or more instructions, when executed by the at least one processor, may cause the at least one processor to communicate, by the consent service system, a consent token request to a consent ledger system. The consent token request may include the identification token, the beneficiary system identification, and data associated with the data request. The one or more instructions, when executed by the at least one processor, may cause the at least one processor to generate, by the consent ledger system, a consent token associated with the consent token request and the user. The one or more instructions, when executed by the at least one processor, may cause the at least one processor to communicate, by the consent ledger system, the consent token to the consent requester system. The one or more instructions, when executed by the at least one processor, may cause the at least one processor to receive, by the resource provider system, the consent token. The one or more instructions, when executed by the at least one processor, may cause the at least one processor to communicate, by the resource provider system, the user data associated with the consent token to the consent beneficiary system.

According to non-limiting embodiments or aspects, provided is a system, including at least one processor and at least one non-transitory computer-readable medium including one or more instructions that, when executed by the at least one processor, direct the at least one processor to perform any of the methods described herein.

According to non-limiting embodiments or aspects, provided is a computer program product including at least one non-transitory computer-readable medium including one or more instructions that, when executed by at least one processor, cause the at least one processor to perform any of the methods described herein.

Further non-limiting embodiments or aspects are set forth in the following numbered clauses:

Clause 1: A computer-implemented method, comprising receiving, by a consent database, a first data request for user data associated with a user from a requester system, the user data stored in a user data database separate from the consent database; communicating, by the consent database, a consent request to the requester system for display to the user on a user device associated with the user; receiving, by the consent database, a consent response from the requester system based on input from the user device, the consent response indicating consent from the user to share the user data requested in the first data request; storing, by the consent database, consent data associated with the consent response for the user data requested in the first data request in an immutable ledger; receiving, by the consent database, a consent verification request from the user data database, the consent verification request based on a second data request for the user data from the requester system to the user data database; verifying, by the consent database, the consent verification request based on the consent data stored in the immutable ledger; and communicating, by the consent database, a consent verification response based on verifying the consent verification request to the user data database, the consent verification response indicating consent from the user to share the user data from the user data database with the requester system.

Clause 2: The method of clause 1, further comprising: receiving, by the consent database, from the requester system, utilization data associated with consented use of user data; and storing, by the consent database, the utilization data associated with the user data in the immutable ledger.

Clause 3: The method of clause 1 or clause 2, further comprising: receiving, by the consent database, from the user data database, distribution data associated with a data access of the user data from the requester system; and storing, by the consent database, the distribution data associated with the user data in the immutable ledger.

Clause 4: The method of any of clauses 1-3, further comprising: comparing, by the consent database, the distribution data associated with the user data with the consent data associated with the user data; determining, by the consent database, compliance of the distribution data to conditions of the consent data; and storing, by the consent database, an indication of compliance of the distribution data in the immutable ledger.

Clause 5: The method of any of clauses 1-4, further comprising: comparing, by the consent database, the utilization data associated with the user data with the consent data associated with the user data; determining, by the consent database, compliance of the utilization data to conditions of the consent data; and storing, by the consent database, an indication of compliance of the utilization data in the immutable ledger.

Clause 6: The method of any of clauses 1-5, further comprising: receiving, by the consent database, an audit request associated with the user data from the user data database; and communicating, by the consent database, the indication of compliance of the utilization data associated with the user data to the user data database.

Clause 7: The method of any of clauses 1-6, further comprising: receiving, by the consent database, a revocation request of a consent associated with the user data from the user device; updating, by the consent database, the consent response based on the revocation request; and communicating, by the consent database, the updated consent response to the user data database.

Clause 8: A system for managing consent, the system comprising at least one server computer including at least one processor, the at least one server computer programmed and/or configured to: receive a first data request for user data associated with a user from a requester system, the user data stored in a user data database separate from a consent database; communicate a consent request to the requester system for display to the user on a user device associated with the user; receive a consent response from the requester system based on input from the user device, the consent response indicating consent from the user to share the user data requested in the first data request; store consent data associated with the consent response for the user data requested in the first data request in an immutable ledger; receive a consent verification request from the user data database, the consent verification request based on a second data request for the user data from the requester system to the user data database; verify the consent verification request based on the consent data stored in the immutable ledger; and communicate a consent verification response based on verifying the consent verification request to the user data database, the consent verification response indicating consent from the user to share the user data from the user data database with the requester system.

Clause 9: The system of clause 8, wherein the at least one server computer is programmed and/or configured to: receive from the requester system, utilization data associated with consented use of user data; and store the utilization data associated with the user data in the immutable ledger.

Clause 10: The system of clause 8 or clause 9, wherein the at least one server computer is programmed and/or configured to: receive from the user data database, distribution data associated with a data access of the user data from the requester system; and store the distribution data associated with the user data in the immutable ledger.

Clause 11: The system of any of clauses 8-10, wherein the at least one server computer is programmed and/or configured to: compare the distribution data associated with the user data with the consent data associated with the user data; determine compliance of the distribution data to conditions of the consent data; and store an indication of compliance of the distribution data in the immutable ledger.

Clause 12: The system of any of clauses 8-11, wherein the at least one server computer is programmed and/or configured to: compare the utilization data associated with the user data with the consent data associated with the user data; determine compliance of the utilization data to conditions of the consent data; and store an indication of compliance of the utilization data in the immutable ledger.

Clause 13: The system of any of clauses 8-12, wherein the at least one server computer is programmed and/or configured to: receive an audit request associated with the user data from the user data database; and communicate the indication of compliance of the utilization data associated with the user data to the user data database.

Clause 14: The system of any of clauses 8-13, wherein the at least one server computer is programmed and/or configured to: receive a revocation request of a consent associated with the user data from the user device; update the consent response based on the revocation request; and communicate the updated consent response to the user data database.

Clause 15: A computer program product comprising at least one non-transitory computer-readable medium including one or more program instructions that, when executed by at least one processor, cause the at least one processor to: receive a first data request for user data associated with a user from a requester system, the user data stored in a user data database separate from a consent database; communicate a consent request to the requester system for display to the user on a user device associated with the user; receive a consent response from the requester system based on input from the user device, the consent response indicating consent from the user to share the user data requested in the first data request; store consent data associated with the consent response for the user data requested in the first data request in an immutable ledger; receive a consent verification request from the user data database, the consent verification request based on a second data request for the user data from the requester system to the user data database; verify the consent verification request based on the consent data stored in the immutable ledger; and communicate a consent verification response based on verifying the consent verification request to the user data database, the consent verification response indicating consent from the user to share the user data from the user data database with the requester system.

Clause 16: The computer program product of clause 14 or clause 15, wherein the one or more program instructions further cause the at least one processor to: receive from the requester system, utilization data associated with consented use of user data; and store the utilization data associated with the user data in the immutable ledger.

Clause 17: The computer program product of any of clauses 14-16, wherein the one or more program instructions further cause the at least one processor to: receive from the user data database, distribution data associated with a data access of the user data from the requester system; and store the distribution data associated with the user data in the immutable ledger.

Clause 18: The computer program product of any of clauses 14-17, wherein the one or more program instructions further cause the at least one processor to: compare the distribution data associated with the user data with the consent data associated with the user data; determine compliance of the distribution data to conditions of the consent data; and store an indication of compliance of the distribution data in the immutable ledger.

Clause 19: The computer program product of any of clauses 14-18, wherein the one or more program instructions further cause the at least one processor to: compare the utilization data associated with the user data with the consent data associated with the user data; determine compliance of the utilization data to conditions of the consent data; and store an indication of compliance of the utilization data in the immutable ledger.

Clause 20: The computer program product of any of clauses 14-19, wherein the one or more program instructions further cause the at least one processor to: receive an audit request associated with the user data from the user data database; and communicate the indication of compliance of the utilization data associated with the user data to the user data database.

Clause 21: A computer-implemented method, comprising: receiving, by a consent service system, a data request for user data associated with a user from a consent requester system, wherein the user data is stored in a resource provider system, and wherein the data request comprises a consent beneficiary system identification associated with a consent beneficiary system; receiving, by the consent service system, an identification token, wherein the identification token authenticates an identity of the user associated with the data request; communicating, by the consent service system, a consent token request to a consent ledger system, wherein the consent token request comprises the identification token, the beneficiary system identification, and data associated with the data request; generating, by the consent ledger system, a consent token associated with the consent token request and the user; communicating, by the consent ledger system, the consent token to the consent requester system; receiving, by the resource provider system, the consent token; and communicating, by the resource provider system, the user data associated with the consent token to the consent beneficiary system.

Clause 22: The method of clause 21, wherein the consent requester system comprises at least one of the consent beneficiary system, a consent presenter system, or any combination thereof.

Clause 23: The method of clause 21 or clause 22, further comprising: receiving, by a consent presenter system, a service request from a user via a graphical user interface displayed on a user device of the user; communicating, by the consent presenter system, the service request to the consent beneficiary system; and communicating, by the consent beneficiary system, the data request to the consent requester system based on receiving the service request.

Clause 24: The method of any of clauses 21-23, wherein the data request comprises at least one consent item associated with the user data, wherein each consent item of the at least one consent item comprises at least one of: consent item type data associated with a type of the consent item; duration data associated a duration of the consent item; time range data associated a time range of the consent item; frequency data associated a frequency of how often the consent item will be requested; time span data associated with a time span of the consent item; consent state data associated with a state of the consent item; consent status data associated with a status of the consent item; primary purpose data associated with at least one primary purpose for which the consent item will be used; secondary purpose data associated with at least one secondary purpose for which the consent item will be use, the at least one secondary purpose different than the at least one primary purpose; or any combination thereof.

Clause 25: The method of any of clauses 21-24, further comprising: communicating, by the consent service system, the data request to a consent directory service system; receiving, by the consent service system, resource provider identification data associated with at least one resource provider system storing the user data, the at least one resource provider system comprising the resource provider system; and communicating, by the consent service system, the resource provider identification data to the consent requester system.

Clause 26: The method of any of clauses 21-25, further comprising: receiving, by the consent service system, resource provider selection data associated with the resource provider system of the at least one resource provider system; communicating, by the consent service system, the resource provider selection data to the consent directory service system; receiving, by the consent service system, identity provider identification data associated with at least one identity provider system authorized to authenticate the identity of the user; and communicating, by the consent service system, the identity provider identification data to the consent requester system.

Clause 27: The method of any of clauses 21-26, wherein an identity provider system of the at least one identity provider system generates the identification token based on receiving authentication data from the user.

Clause 28: The method of any of clauses 21-27, wherein receiving the identification token comprises receiving, by the consent service system, a consent request from the consent requester system, wherein the consent request comprises the identification token and at least one consent item associated with the user data, wherein each consent item comprises at least one of the beneficiary system identification, the data associated with the data request, or any combination thereof.

Clause 29: The method of any of clauses 21-28, wherein communicating the consent token request comprises communicating, by the consent service system, the consent request to the consent ledger system.

Clause 30: The method of any of clauses 21-29, wherein generating the consent token comprises generating, by the consent ledger system, the consent token based on the consent request, and wherein communicating the consent token to the consent requester system comprises: communicating, by the consent ledger system, the consent token to the consent service system; and communicating, by the consent service system, the consent token to the consent requester system.

Clause 31: The method of any of clauses 21-30, further comprising: communicating, by the consent requester system, the consent token to the consent beneficiary system; storing, by the consent beneficiary system, the consent token; and communicating, by the consent beneficiary system, the consent token to the resource provider system.

Clause 32: The method of any of clauses 21-31, further comprising: communicating, by the resource provider system, a token validation request based on the consent token to the consent service system; and receiving, by the resource provider system, a token validation response indicating that the consent token is valid.

Clause 33: The method of any of clauses 21-32, wherein communicating the user data to the consent beneficiary system comprises communicating, by the resource provider system, at least one consent value for each consent item of the at least one consent item, each consent value comprising at least a portion of the user data.

Clause 34: A system, comprising: a resource provider system; a consent ledger system; and a consent service system configured to: receive a data request for user data associated with a user from a consent requester system, wherein the user data is stored in a resource provider system, and wherein the data request comprises a consent beneficiary system identification associated with a consent beneficiary system; receive an identification token, wherein the identification token authenticates an identity of the user associated with the data request; and communicate a consent token request to a consent ledger system, wherein the consent token request comprises the identification token, the beneficiary system identification, and data associated with the data request; wherein the consent ledger system is configured to: generate a consent token associated with the consent token request and the user; and communicate the consent token to the consent requester system; wherein the resource provider system is configured to: receive the consent token; and communicate the user data associated with the consent token to the consent beneficiary system.

Clause 35: A computer program product comprising at least one non-transitory computer-readable medium including one or more instructions that, when executed by at least one processor, cause the at least one processor to: receive, by a consent service system, a data request for user data associated with a user from a consent requester system, wherein the user data is stored in a resource provider system, and wherein the data request comprises a consent beneficiary system identification associated with a consent beneficiary system; receive, by the consent service system, an identification token, wherein the identification token authenticates an identity of the user associated with the data request; communicate, by the consent service system, a consent token request to a consent ledger system, wherein the consent token request comprises the identification token, the beneficiary system identification, and data associated with the data request; generate, by the consent ledger system, a consent token associated with the consent token request and the user; communicate, by the consent ledger system, the consent token to the consent requester system; receive, by the resource provider system, the consent token; and communicate, by the resource provider system, the user data associated with the consent token to the consent beneficiary system.

Clause 36: A system, comprising: at least one processor; and at least one non-transitory computer-readable medium including one or more instructions that, when executed by the at least one processor, direct the at least one processor to perform the method of any one of clauses 1-7 or 21-33.

Clause 37: A computer program product comprising at least one non-transitory computer-readable medium including one or more instructions that, when executed by at least one processor, cause the at least one processor to perform the method of any one of clauses 1-7 or 21-33.

These and other features and characteristics of the present disclosure, as well as the methods of operation and functions of the related elements of structures and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the disclosure. As used in the specification and the claims, the singular form of "a," "an," and "the" include plural referents unless the context clearly dictates otherwise.

BRIEF DESCRIPTION OF THE DRAWINGS

Additional advantages and details are explained in greater detail below with reference to the exemplary embodiments that are illustrated in the accompanying schematic figures, in which:

FIGS. 1B-1F are swimlane diagrams of exemplary processes for consent management, according to non-limiting embodiments or aspects of the presently disclosed subject matter;

FIGS. 2B-2E are swimlane diagrams of exemplary processes for consent management, according to non-limiting embodiments or aspects of the presently disclosed subject matter;

DESCRIPTION

Figure 1A:
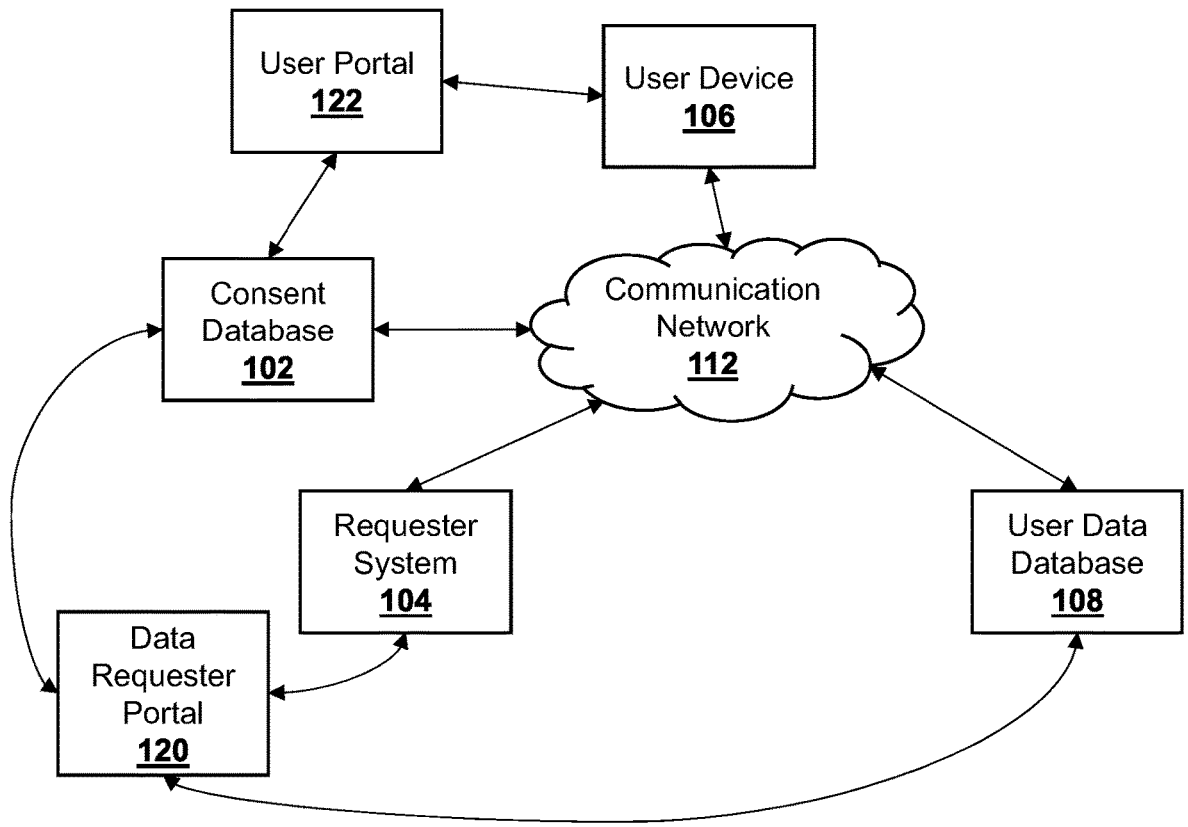
FIG. 1A is a schematic diagram of an exemplary system for consent management, according to non-limiting embodiments or aspects of the presently disclosed subject matter.

For purposes of the description hereinafter, the terms "end," "upper," "lower," "right," "left," "vertical," "horizontal," "top," "bottom," "lateral," "longitudinal," and derivatives thereof shall relate to the embodiments as they are oriented in the drawing figures. However, it is to be understood that embodiments may assume various alternative variations and step sequences, except where expressly specified to the contrary. It is also to be understood that the specific devices and processes illustrated in the attached drawings, and described in the following specification, are simply exemplary embodiments or aspects of the disclosure. Hence, specific dimensions and other physical characteristics related to the embodiments or aspects disclosed herein are not to be considered as limiting.

No aspect, component, element, structure, act, step, function, instruction, and/or the like used herein should be construed as critical or essential unless explicitly described as such. Also, as used herein, the articles "a" and "an" are intended to include one or more items and may be used interchangeably with "one or more" and "at least one." Furthermore, as used herein, the term "set" is intended to include one or more items (e.g., related items, unrelated items, a combination of related and unrelated items, and/or the like) and may be used interchangeably with "one or more" or "at least one." Where only one item is intended, the term "one" or similar language is used. Also, as used herein, the terms "has," "have," "having," or the like are intended to be open-ended terms. Further, the phrase "based on" is intended to mean "based at least partially on" unless explicitly stated otherwise.

As used herein, the terms "communication" and "communicate" may refer to the reception, receipt, transmission, transfer, provision, and/or the like, of information (e.g., data, signals, messages, instructions, commands, and/or the like). For one unit (e.g., a device, a system, a component of a device or system, combinations thereof, and/or the like) to be in communication with another unit means that the one unit is able to directly or indirectly receive information from and/or transmit information to the other unit. This may refer to a direct or indirect connection (e.g., a direct communication connection, an indirect communication connection, and/or the like) that is wired and/or wireless in nature. Additionally, two units may be in communication with each other even though the information transmitted may be modified, processed, relayed, and/or routed between the first and second unit. For example, a first unit may be in communication with a second unit even though the first unit passively receives information and does not actively transmit information to the second unit. As another example, a first unit may be in communication with a second unit if at least one intermediary unit (e.g., a third unit located between the first unit and the second unit) processes information received from the first unit and communicates the processed information to the second unit. In some non-limiting embodiments or aspects, a message may refer to a network packet (e.g., a data packet, and/or the like) that includes data. It will be appreciated that numerous other arrangements are possible.

As used herein, the term "mobile device" may refer to one or more portable electronic devices configured to communicate with one or more networks. As an example, a mobile device may include a cellular phone (e.g., a smartphone or standard cellular phone), a portable computer (e.g., a tablet computer, a laptop computer, etc.), a wearable device (e.g., a watch, pair of glasses, lens, clothing, and/or the like), a personal digital assistant (PDA), and/or other like devices. The term "client device," as used herein, refers to any electronic device that is configured to communicate with one or more servers or remote devices and/or systems. A client device may include a mobile device, a network-enabled appliance (e.g., a network-enabled television, refrigerator, thermostat, and/or the like), a computer, a point-of-sale (POS) system, and/or any other device or system capable of communicating with a network.

As used herein, the term "computing device" may refer to one or more electronic devices that are configured to directly or indirectly communicate with or over one or more networks. The computing device may be a mobile device. In other non-limiting embodiments or aspects, the computing device may be a desktop computer, a server, a group of servers, or other non-mobile computer. Furthermore, the term "computer" may refer to any computing device that includes the necessary components to receive, process, and output data, and normally includes a display, a processor, a memory, an input device, and a network interface. The term "application" may refer to computer code or other data sorted on a computer-readable medium that may be executed by a processor to facilitate the interaction between software components, such as a client-side front-end and/or server-side back-end for receiving data from the client. The term "interface" may refer to a generated display, such as one or more graphical user interfaces (GUIs) with which a user may interact, either directly or indirectly (e.g., through a keyboard, mouse, etc.).

As used herein, the term "server" may refer to or include one or more computing devices that are operated by or facilitate communication and processing for multiple parties in a network environment, such as the Internet, although it will be appreciated that communication may be facilitated over one or more public or private network environments and that various other arrangements are possible. Further, multiple computing devices (e.g., servers, point-of-sale (POS) devices, mobile devices, etc.) directly or indirectly communicating in the network environment may constitute a "system." Reference to "a server" or "a processor," as used herein, may refer to a previously-recited server and/or processor that is recited as performing a previous step or function, a different server and/or processor, and/or a combination of servers and/or processors. For example, as used in the specification and the claims, a first server and/or a first processor that is recited as performing a first step or function may refer to the same or different server and/or a processor recited as performing a second step or function.

As used herein, the term "system" may refer to one or more computing devices or combinations of computing devices such as, but not limited to, processors, servers, client devices, software applications, and/or other like components.

The term "account data," as used herein, refers to any data concerning one or more accounts for one or more users. Account data may include, for example, one or more account identifiers, user identifiers, transaction histories, balances, credit limits, issuer institution identifiers, and/or the like.

As used herein, the term "token" may refer to a data structure and/or an identifier that is used to authenticate and/or used as a substitute or replacement for another identifier. As used herein, the term "payment token" may refer to an account identifier that is used as a substitute or replacement for another account identifier, such as a primary account number (PAN). Payment tokens may be associated with a PAN or other original account identifier in one or more data structures (e.g., one or more databases and/or the like) such that they may be used to conduct a payment transaction without directly using the original account identifier. In some non-limiting embodiments or aspects, an original account identifier, such as a PAN, may be associated with a plurality of payment tokens for different individuals or purposes. In some non-limiting embodiments or aspects, payment tokens may be associated with a PAN or other account identifiers in one or more data structures such that they can be used to conduct a transaction without directly using the PAN or the other account identifiers. In some examples, an account identifier, such as a PAN, may be associated with a plurality of payment tokens for different uses or different purposes.

Non-limiting embodiments or aspects described herein are directed to a system, method, and computer program product for consent management. Currently, when a user decides to grant permission for use of their data that is stored with an entity (e.g., a provider and/or holder of such data), each provider of the user data and each user of the user data must track and store the consents granted or denied by each user. This results in great difficulty of the user to keep track of their user data as it may be difficult to determine who was granted permission. The user does not have any simple method of determining if their data is being utilized in a manner which aligns with their consent. There may be events in which it is necessary for a user to quickly revoke consent for particular user data in order to protect such data from misuse. However, having to contact every provider or receiver of the data can leave the user data vulnerable due to the time required to contact multiple entities, as well as the increased likelihood that at least one provider or receiver of the data may be overlooked. Non-limiting embodiments or aspects described herein provide a unique arrangement and architecture that allows for management of user consent. User consents are stored in a centralized consent database such that a user can determine all of the consents granted by the user and to whom the consent was granted. This database can be accessed by providers of user data and requesters of user data. This reduces the amount of computing resources needed by requesters and providers of data as they no longer have to store and maintain the consents of every user themselves. The user data is, thus, more secure as a provider is less likely to provide data to an unauthorized user since the entity tracking consent of the user is separate from the provider of the data that stands to gain from sharing the data. The consent database may also be an immutable ledger, increasing security of the user data by ensuring that a single entity cannot alter a consent without the user's knowledge. Security of the user data is also increased by allowing the user to quickly identify all consents in a single location. In the event that a particular aspect of the user's data becomes compromised or otherwise becomes a concern, the user is able to quickly identify all requesters that have access to the user data and all providers that can provide the user data and communicate a revocation of any consents provided for that user data. Due to the fast nature of online communication, the ability to quickly revoke consents is necessary to ensure improved security of the user data. Uniformity of the consents also increase security of the user data. By standardizing the representation of the consents, the user is more easily able to understand exactly what permissions the user is granting, as opposed to attempting to understand dozens of different formats from dozens of different requesters or providers. It also creates increased efficiencies for provider systems and requester systems. Instead of a provider system or requester system needing to interpret dozens or hundreds of different formats of data requests, which can result in errors in interpretations, a standardized format allows for the ability to increase automation of requests by allowing requesters and providers to only need to process a single format. The ability to automate requests decreases computational resources and personnel resources needed to interpret data requests, resulting in faster and more secure processing of user data. Non-limiting embodiments or aspects described herein enable taking an action on behalf of a user (e.g., in addition to, in lieu of, or as part of sharing and/or using user data), such as enabling at least one device and/or system to perform an action (e.g., unlock a smart lock on a door to allow a delivery to be placed inside, allow a connected car to initiate proximity-based payments, etc.) based on consent from the user.

Referring now to FIG. 1A, shown is a system 100 for consent management, according to non-limiting embodiments or aspects of the presently disclosed subject matter. The system 100 includes a consent database 102, a requester system 104, a user device 106, and a user data database 108. The consent database 102, requester system 104, user device 106, and user data database 108 may each include one or more computing devices configured to communicate through one or more communication networks, such as a communication network 112. In non-limiting embodiments or aspects, the consent database 102 may be a component of a consent system, or a separate system. In non-limiting embodiments or aspects, the user data database 108 may be a component of a data holder (e.g., resource provider) system or a separate system.

With continued reference to FIG. 1A, in some non-limiting embodiments or aspects, a requester may communicate a data use request through their requester system 104 to the consent database 102. The requester may use the system 100 to gain access to permissioned data of users for their own business purposes.

The data use request may include one or more data components associated with the specific data that the requester is seeking. This may include one or more data fields (e.g., type of data such as geographic location, transactions, payment history, time of events, online activities, websites accessed, and/or the like). The data components may also include one or more data holders (e.g., the entity/ person/company/party/server, etc. that stores the data) and/or one or more data receivers (e.g., the entity/person/company/party/server, etc. that will receive the data). The data receiver may be the data requester, or may be a third party to whom the requester intends to communicate the data or may communicate the data. Additional data components may include at least one data field (e.g., type of data), one or more purposes of the use of the requested data, one or more volumes of data requested, one or more durations of the request, one or more frequencies of the request, and/or the like.

The purpose of the requested data may include the intended use of the data associated with at least one user. The data use request may include a textual explanation of the intended use. The textual explanation may include one sentence or paragraph to provide a concise explanation of the intended use.

The volume of data requested may include a date range for which the data was generated or occurred (e.g., all data available between Aug. 1, 2015 and Sep. 15, 2018; all data available from Sep. 1, 2020 through the present; all data from the present onward; and/or the like), number of data entries (e.g., 200 entries, 1000 entries, and/or the like), data size (e.g., 1 GB of data, 100 GB of data, 1 TB of data, and/or the like), and/or the like.

The at least one frequency may declare how often the data requester intends to access the data (e.g., daily, once every month, once every year, etc.). The frequency may be a single-use. More than one frequency may be included, and may be associated with different data components. For example, if two purposes are included and two different durations are included, a different frequency may be associated with each of the purposes, each of the durations, and/or different combinations of the purposes and durations.

The duration may include a number of times the data can be accessed (e.g., a single access, 20 accesses, 100 accesses, etc.) and/or a time period in which the data can be accessed (e.g., one month after permission granted, until Jun. 12, 2023, until permission is revoked, and/or the like). More than one duration may be included, and may be associated with different data components. For example, if two purposes are included and two different frequencies are included, a different duration may be associated with each of the purposes, each of the frequencies, and/or different combinations of the purposes and frequencies.

In some non-limiting embodiments or aspects, components of the data use request, such as data holder, data field, purpose, volume, duration, frequency, and data receiver, may be determined from the textual explanation of the intended use. The components may be determined from the textual explanation by artificial intelligence or a keyword database.

With continued reference to FIG. 1A, in some non-limiting embodiments or aspects, the requester system 104 may communicate with the consent database 102 through a data requester portal 120. The data requester portal 120 may be displayed through a User Interface (UI) service to the requester and/or data holder. The data requester portal 120 may be hosted on a server (e.g., a server operated by the consent database 102, consent system, or third party). The data requester portal 120 may facilitate communication between consent database 102, requester system 104, and user data database 108. The data requester portal 120 may facilitate the data sharing between the requester system 104 and the user data database 108 based on permissions granted by the user and stored in the consent database 102.

With continued reference to FIG. 1A, in some non-limiting embodiments or aspects, the requester system 104 may communicate the data use request through the data requester portal 120. The requester system 104 may set up a desired data-sharing use case (e.g., a data use request) through the data requester portal 120. The requester system 104 may make selections and/or describe the user data in which they are requesting access. The requester may enter information or make selections through a keyboard, mouse, touchpad, etc. through the data requester portal 120 accessed through the requester system 104. The data use request may be automated by the requester system 104. The requester system 104 may communicate at least one data holder, at least one data field, at least one purpose, at least one volume, at least one duration, at least one frequency, and at least one user of the data.

With continued reference to FIG. 1A, in some non-limiting embodiments or aspects, data requester portal 120 may allow for standardization of data requests from requesters. Such standardization may allow easier understanding and differentiation between requesters and uses of data. In some non-limiting embodiments or aspects, the UI design of the data requester portal 120 may differ based on the type of requester or type of data sought.

With continued reference to FIG. 1A, in some non-limiting embodiments or aspects, the consent database 102 may receive the data use request and determine if the data use request meets predetermined standards. The predetermined standards may require that the data use request includes at least one data component or a certain number of data components. The predetermined standards may require all of a predetermined list of data components. The data use request may include additional information beyond what is required by the standards. In some non-limiting embodiments or aspects, the predetermined standards may depend on one of the components, such as the data field.

With continued reference to FIG. 1A, in some non-limiting embodiments or aspects, if the data use request does not meet the predetermined standards, the data use request may be rejected. The consent database 102 may communicate the rejection to the requester system 104. The rejection may be communicated through the data requester portal 120. The rejection may include the reason for the rejection, such as mission components, invalid entries, or entries out of range.

With continued reference to FIG. 1A, in some non-limiting embodiments or aspects, if the data use request meets the predetermined standards, the data use request may be accepted. The consent database 102 may communicate the acceptance to the requester system 104. The acceptance may be communicated through the data requester portal 120.

With continued reference to FIG. 1A, in some non-limiting embodiments or aspects, if the data use request is accepted, the consent database 102 may store the components of the data use request in the consent database 102. The consent database 102 may initiate a communication with a user to obtain consents based on the data use request. The consent database 102 may communicate to the user through the user device 106 associated with the user. The user contacted may be dependent on the components of the data use request. For example, if the data request includes a particular data holder and a particular data type, the consent database 102 may communicate to each user that has that data type with the data holder in response to receiving the data use request. The users that have the data type with the data holder may be determined based on the data included in the consent database, including registered users with registered accounts associated with the data holder.

With continued reference to FIG. 1A, in some non-limiting embodiments or aspects, the consent database 102 may communicate with the user device 106 through a consumer portal 122. The user device 106 may be selected by the user. The consumer portal 122 may include a UI displayed through the user device 106. The consumer portal 122 may be hosted by the consent system, consent database 102, requester system 104, user data database 108, and/or the data holder system. If the consumer portal 122 is hosted by the requester system 104, the UI may utilize JavaScript Object Notation (JSON) from the consent system or consent database 102.

With continued reference to FIG. 1A, in some non-limiting embodiments or aspects, the consumer portal 122 may be hosted by the consent database 102, and the consent database 102 may communicate the consumer portal 122 to the requester system 104. The user may receive a notification to access the consumer portal 122. The notification may be communicated from the requester system 104 or the consent database 102. The notification may be communicated to the user device 106 associated with the user. The user may access the consumer portal 122 through the user device 106.

With continued reference to FIG. 1A, in some non-limiting embodiments or aspects, the consumer portal 122 may present the user with permission choices for the user's data. The consumer portal 122 may display the data components associated with the data use request. Each data component may be displayed to provide the user with a full understanding of what data is being requested, who is requesting the data, and how the data is being used. The consumer portal 122 may provide a uniform presentation of the data components in order to ensure a consistent and clear experience for granting or denying permissions related to data access. Each data use request may be presented to the user in a similar or same format to ensure the user understands the request as compared to other requests. The data components presented to the user through the consumer portal 122 may include the data holder, data field, purpose, volume, duration, frequency, data requester, and/or the like.

With continued reference to FIG. 1A, in some non-limiting embodiments or aspects, the user may enter a use response into the consumer portal 122 through the user device 106 associated with the data use request. The use response may include indicating the proposed use by the requester is allowable or not allowable. The user may enter an acceptance response of the use, for example, an opt-in, approval, allowance, acceptance, and/or the like, to indicate that the user will allow the use as described by the data request. The user may also enter a rejection response of the use, for example, an opt-out, denial, refusal, rejection, and/or the like.

With continued reference to FIG. 1A, in some non-limiting embodiments or aspects, the user may enter a data transfer response into the consumer portal 122 through the user device 106 associated with the data use request. The data transfer response may indicate how the data will be shared between the requester and the data holder. The data may be shared by the requester system 104 or a third-party system accessing the data from the user data database 108 and downloading the data from the user data database 108 (e.g., the requester system 104 may pull the data from the user data database 108). The data may also be shared by the user data database 108 communicating the data to the requester system 104 or a third-party system (e.g., the user data database 108 pushes the data to the requester system 104). The user may select pushing the data and/or pulling the data as acceptable methods of data transfer in the data transfer response.

With continued reference to FIG. 1A, in some non-limiting embodiments or aspects, the user may enter an access response into the consumer portal 122 through the user device 106 associated with the data use request. The access response may indicate the rights of the requester system 104 or third party to change the user data. The user may select to provide only read access. The read access may allow the requester system 104 or third party to receive the data and process the data. The user may select to provide write access. The write access may allow the requester system 104 or third party to receive the data, process the data, and change the data. Changing the data may include adding data to the database, deleting data from the database, or altering data in the database.

With continued reference to FIG. 1A, in some non-limiting embodiments or aspects, the consent database 102 may receive consent response data of the user. The requester system 104 may communicate the consent response data to the consent database 102. The user device 106 may communicate the consent response data to the consent database 102 through the consumer portal 122. The consent response data may include the use response, the data transfer response, and/or the access response. The consent database 102 may compare the consent response data to verification requirements. The verification requirements may be a predetermined set of standards for the consent response data. If the consent response data does not meet the verification requirements, the consent database 102 may communicate a rejection to the requester system 104.

With continued reference to FIG. 1A, in some non-limiting embodiments or aspects, if the consent response data meets the verification requirements, the consent database 102 may codify the consent response data. Codifying the consent response data may include tokenizing any sensitive information (e.g., PAN, social security number, etc.). The consent database 102 may attach codification details to each data element of the consent response data. The de-identified codification results may be stored in the consent database 102. The consent database 102 may then publish the codified consent response data to an immutable ledger. In some non-limiting embodiments or aspects, an immutable ledger may include a ledger and/or database for which data stored therein cannot be changed (or cannot easily be changed). For example, an immutable ledger may include a blockchain, a version-controlled database, an append-only database, and/or the like.

With continued reference to FIG. 1A, in some non-limiting embodiments or aspects, the requester system 104 may communicate a data request to the user data database 108. The data request may be communicated through the data requester portal 120 or through the communication network 112. The data request may include at least one component of the data use request, such as at least one data holder, at least one data field, at least one purpose, at least one volume, at least one duration, at least one frequency, and/or at least one user of the data.

With continued reference to FIG. 1A, in some non-limiting embodiments or aspects, in response to receiving the data request, the user data database 108 may communicate a consent verification to the consent database 102 based on the data request. The consent verification may be communicated through the data requester portal 120 or through the communication network 112. The consent verification may include at least one component of the data request (e.g., at least one data holder, at least one data field, at least one purpose, at least one volume, at least one duration, at least one frequency, and/or at least one user of the data). The consent verification may ensure that the user has granted the appropriate permissions that would allow the user data database 108 to share the user data with the requester system 104 based on the components of the data request.

With continued reference to FIG. 1A, in some non-limiting embodiments or aspects, in response to receiving the consent verification, the consent database 102 may compare the components of the consent verification with the codified consents stored in the immutable ledger. If the codified consents do not match the consent verification (e.g., the user did not consent to the sharing of the data to the requester, sharing the requested volume of data, sharing the data for the duration requested, sharing the data for the frequency requested, sharing the data for the stated purpose, and/or sharing the data from the data holder), then the consent database 102 may communicate a rejection of the consent verification to the user data database 108 and/or requester system 104. The rejection of the consent verification may include which component of the consent verification violates the consents from the user. The consent database 102 may initiate a consent reconciliation review between the user data database 108 and the requester system 104 in order to determine what changes to the data request are needed in order to meet the requirements of the user consents.

With continued reference to FIG. 1A, in some non-limiting embodiments or aspects, if the consent verification matches the codified consents, the consent database 102 may communicate a completed verification to the user data database 108. The completed verification may indicate that the user has provided appropriate consents to allow the transfer of data as described in the consent verification. In response to receiving the completed verification, the user data database 108 may fulfill the data request. The user data database 108 may communicate the data as described in the data request to the requester system 104. The data may be communicated through the data requester portal 120 or the communication network 112. The consent database 102 may provide direct connectivity between the requester system 104 and the user data database 108 supported by at least one application programming interface (API) to support the transfer of data between the user data database 108 and the requester system 104. The data may be transferred either by the user data database 108 pushing the data to the requester system 104 or the requester system 104 pulling the data from the user data database 108. In response to fulfilling the data request, the user data database 108 may communicate a record of the data request fulfillment to the consent database. The record of the fulfillment may include the time of the transfer, method of the transfer, and the components of the transfer. The record of the fulfillment may be communicated through the data requester portal 120 or the communication network 112.

With continued reference to FIG. 1A, in some non-limiting embodiments or aspects, the user may manage consents and revocation of consents through the consumer portal 122. The user may access the consumer portal 122 at any time. The consumer portal 122 may display all permissions associated with the user. These permissions may include all permissions for user data sharing that were granted and/or denied. At any point, the user may manage, grant, and/or revoke permissions to all or individual data holders and/or requesters. The user may update the consents through the consumer portal 122 using the user device 106. The updated consents may be communicated directly or indirectly to the consent database 102. The updated consents may be communicated to the host of the consumer portal 122, and the host may communicate the updated consents to the consent database 102.

With continued reference to FIG. 1A, in some non-limiting embodiments or aspects, when a user intends to manage the consents of the data associated with the user, the user may access the consumer portal 122 through their user device 106. The user device 106 may communicate a management request with the consent database 102, requester system 104 associated with the user's data, and the user data database 108 associated with the user's data. The management request may indicate that the user wishes to view the consents associated with their account. In response to receiving a management request, the requester system 104 and user data database 108 may communicate a user consent request with the consent database 102. The user consent request may include user device identification data that identifies the user device 106 associated with the user or other identifying information of the user.

With continued reference to FIG. 1A, in some non-limiting embodiments or aspects, if the consent database 102 is hosting the consumer portal 122, the consent database 102 may communicate the UI for the consumer portal 122 to the user device 106. The consent database 102 may communicate the codified consumer consent choices associated with the user to the requester system 104 and user data database 108 associated with the user. In response to receiving the codified consumer consent choices, the requester system 104 and user data database 108 may communicate the codified consumer consent choices to the consumer portal 122. In some non-limiting embodiments or aspects, the consent database 102 may communicate the codified consumer consent choices directly to the consumer portal 122. In response to receiving the codified consumer consent choices, the consumer portal 122 may display the consent choices to the user through the UI of the consumer portal 122 on the user device 106.

With continued reference to FIG. 1A, in some non-limiting embodiments or aspects, after the consent choices are displayed to the user, the user may change the consents that are presented. The user may interact with the UI of the consumer portal 122 through the user device 106 to add, revoke, alter, and/or the like consents associated with the user. The changes of the consents may be communicated to the associated requester systems 104 and/or data user databases 108. In response to receiving changes to the consents, the requester systems 104 and/or the user data databases 108 may communicate the changes to the consent database 102. In some non-limiting embodiments or aspects, the changes may be communicated from the consumer portal 122 to the consent database 102.

With continued reference to FIG. 1A, in some non-limiting embodiments or aspects, in response to receiving consent changes, the consent database 102 may codify the consent changes. Codifying the consent changes may include tokenizing any sensitive information (e.g., PAN, social security number, etc.). The consent database 102 may attach codification details to each data element of the consent change. The de-identified codification results may be stored in the consent database 102. The consent database 102 may then publish the codified consent change data to an immutable ledger.

With continued reference to FIG. 1A, in some non-limiting embodiments or aspects, after the consent database 102 updates the immutable ledger, the consent database 102 may communicate the codified consumer consent choices to the user data database 108 and requester system 104. In response to receiving the updated codified consumer consent choices, the user data database 108 and requester system 104 may communicate the consent choices to the consumer portal 122, which will display the updated choices to the user through the user device 106. If the updated codified consumer consent choices include a revocation of a consent, the requester system 104 or user data database 108 may communicate a verification message that the consent has been revoked.

With continued reference to FIG. 1A, in some non-limiting embodiments or aspects, an audit of the consent choices and data uses may be requested and initiated by a user, a data holder, or a third party, such as an auditor system or regulator system. A user may initiate an audit through the user device 106 through the consumer portal 122. The data holder may initiate an audit through the user data database 108 through the data requester portal 120. A third party may initiate an audit through either the consumer portal 122, requester portal 120, or may communicate with the consent database 102. An audit request may ensure that the data has been used only in compliance with the permissions granted by the user. The audit request may include one or more users, requesters, and/or data holders. The audit request may ensure all data associated with the users, requesters, and/or data holders included in the audit request has been used appropriately (e.g., in compliance with the associated user's permissions). The audit request may be communicated to any requester system 104 associated with the data associated with the requesting user or requesting data holder. The audit request may be communicated to the requester system through the consumer portal 122 or the data requester portal 120. The user data database 108 and/or the requester system 104 may communicate the audit request to the consent database 102. In some non-limiting embodiments or aspects, the user may communicate the audit request to the consent database 102 through the consumer portal 122.

With continued reference to FIG. 1A, in some non-limiting embodiments or aspects, in response to receiving an audit request, the consent database 102 may initiate an audit. The consent database 102 may pull all relevant codified consent data from the immutable ledger associated with the users, requesters, and/or data holders included in the audit request. The consent database 102 may initiate a data trace of all associated requester systems 104. The data trace may determine each use of the data from a user data database 108 by each requester system 104. The consent database 102 may communicate a data trace request to each requester system 104. The data trace request may include at least one user associated with user data from the user data database 108, at least one user data database 108, at least one requester system 104, a time period of the data to be traced, and/or a volume of data to be traced. In response to receiving the data trace request, the requester system 104 may communicate a record of each use of the user data associated with the data trace request. The consent database 102 may compare the record of each use with the codified consent data to ensure the record of each use does not violate the requirements of the codified consent data. The consent database 102 may communicate the results of the comparison in an audit report to the consumer or data holder through the consumer portal 122 or data requester portal 120.

With continued reference to FIG. 1A, in non-limiting embodiments or aspects, a single digital identifier may be associated with a user across multiple platforms. The user may consent to a digital identifier through the consumer portal 122 and may communicate the consent of the digital identifier to the consent database 102.

The number and arrangement of systems and devices shown in FIG. 1A are provided as an example. There may be additional systems and/or devices, fewer systems and/or devices, different systems and/or devices, and/or differently arranged systems and/or devices than those shown in FIG. 1A. Furthermore, two or more systems or devices shown in FIG. 1A may be implemented within a single system or device, or a single system or device shown in FIG. 1A may be implemented as multiple, distributed systems or devices. Additionally or alternatively, a set of systems (e.g., one or more systems) or a set of devices (e.g., one or more devices) of the system 100 may perform one or more functions described as being performed by another set of systems or another set of devices of the system 100.

In reference to FIGS. 1B and 1C, shown is a process 100a for consent management, according to non-limiting embodiments or aspects of the presently disclosed subject matter. In some non-limiting embodiments or aspects, one or more of the steps of the process 100a may be performed (e.g., completely, partially, and/or the like) by the consent database 102. In some non-limiting embodiments or aspects, one or more of the steps of the process 100a may be performed (e.g., completely, partially, and/or the like) by another system, another device, another group of systems, or another group of devices, separate from or including the consent database 102, such as the requester system 104, the user device 106, and/or the user data database 108. The steps shown in FIGS. 1B and 1C are for example purposes only. It will be appreciated that additional, fewer, different, and/or a different order of steps may be used in non-limiting embodiments or aspects.

As shown in FIG. 1B, at step 131, the process 100a may include communicating at least one initial data request for user data. For example, the consent database 102 may receive an initial data request for user data associated with a user from the requester system 104. In some non-limiting embodiments or aspects, the user data may be stored in the user data database 108, which may be separate from the consent database 102.

In some non-limiting embodiments or aspects, the initial data request may include at least one consent use case. For example, the requester system 104 may communicate the initial data request including the consent use case(s) to the consent database 102. For example, the consent use case(s) may include primary purpose data associated with at least one primary purpose for which user data will be used (e.g., use data that is required to provide at least one service to the user). Additionally or alternatively, the consent use case(s) may include at least one secondary purpose data associated with at least one secondary purpose for which user data will be used. For example, the secondary purpose(s) may be different than the primary purpose(s).

As shown in FIG. 1B, at step 132, the process 100a may include communicating an initial response to the initial data request. For example, the consent database 102 may communicate the initial response to the requester system 104 based on the initial data request.

In some non-limiting embodiments or aspects, the initial response may indicate that the initial data request (and/or the consent use case(s) thereof) fails to meet consent standards. For example, the consent database 102 may determine the consent use case(s) (e.g., the primary purpose(s), the secondary purpose(s), and/or the like) do not meet consent standards (e.g., are impermissible purposes, lack sufficient information, and/or the like). In some non-limiting embodiments or aspects, the process 100*a* may stop if the initial response indicates that the initial data request fails to meet consent standards.

In some non-limiting embodiments or aspects, the initial response may indicate that the initial data request (and/or the consent use case(s) thereof) is verified. For example, the consent database 102 may determine the consent use case(s) (e.g., the primary purpose(s), the secondary purpose(s), and/or the like) meet consent standards (e.g., are permissible purposes, include sufficient information, and/or the like). In some non-limiting embodiments or aspects, the process 100*a* may proceed to step 133 if the consent use case requests meet consent standards.

As shown in FIG. 1B, at step 133, the process 100*a* may include communicating a consent request. For example, consent database 102 may communicate consent request to requester system 104.

In some non-limiting embodiments or aspects, the consent request may include a hosted consent interface. For example, the consent database 102 may communicate the hosted consent interface (e.g., a UI, a GUI, at least one web page, and/or the like) to the requester system 104. In some non-limiting embodiments or aspects, the consent database 102 may communicate at least one JSON message to the requester system 104 to render the hosted consent interface. For example, the JSON message(s) may include at least one JSON object associated with at least one graphical element (e.g., button, checkbox, drop down menu, text box, and/or the like) and/or at least one field for the consent request.

As shown in FIG. 1B, at step 141, the process 100*a* may include initiating a consent experience. For example, the user device 106 may initiate a consent experience with the requester system 104.

In some non-limiting embodiments or aspects, initiating a consent experience may include the user device 106 receiving input from a user to request at least one service from the requester system 104. For example, the service(s) may be associated with at least one consent use case, as described herein.

As shown in FIG. 1B, at step 142, the process 100*a* may include communicating the consent request. For example, the requester system 104 may communicate the consent request to the user device 106.

In some non-limiting embodiments or aspects, the consent request may include a hosted consent interface, as described herein. Additionally or alternatively, the user device 106 may display the hosted consent interface. For example, the requester system 104 may communicate the hosted consent interface to the user device 106, which may display the hosted consent interface.

As shown in FIG. 1B, at step 143, the process 100*a* may include communicating a consent response. For example, the user device 106 may communicate the consent response to the requester system 104. In some non-limiting embodiments or aspects, the consent response may indicate consent from the user to share the user data requested in the initial data request.

In some non-limiting embodiments or aspects, communicating a consent response may include the user device 106 receiving input from a user indicating the user consents to sharing the user data. For example, the user may select at least one graphical element (e.g., button, checkbox, drop down menu, text box, and/or the like) of the hosted consent interface (e.g., UI, GUI, and/or the like) to indicate consent to sharing the requested user data. In some non-limiting embodiments or aspects, based on the user input, the user device 106 may communicate the consent response to the requester system 104.

As shown in FIG. 1B, at step 144, the process 100*a* may include communicating the consent response. For example, the requester system 104 may communicate the consent response to the consent database 102. In some non-limiting embodiments or aspects, the consent response may indicate consent from the user to share the user data requested in the initial data request, as described herein.

In some non-limiting embodiments or aspects, the consent database 102 may verify the consent response. If the consent response does not meet verification requirements (e.g., cannot be verified), the process 100*a* may proceed to step 145. If the consent response does meet the verification requirements, the process 100*a* may proceed to step 146.

As shown in FIG. 1B, at step 145, the process 100*a* may include communicating based on the consent response. For example, the consent database 102 may communicate at least one communication with the requester system 104 based on the consent response.

In some non-limiting embodiments or aspects, the at least one communication may include an indication that the consent response does not meet verification requirements (e.g., cannot be verified). In some non-limiting embodiments or aspects, the process 100*a* may stop if the at least one communication indicates that the consent response does not meet verification requirements.

In some non-limiting embodiments or aspects, the at least one communication may include an indication that the consent response does meet verification requirements. In some non-limiting embodiments or aspects, the process 100*a* may proceed to step 146 if the at least one communication indicates that the consent response does meet verification requirements.

As shown in FIG. 1B, at step 146, the process 100*a* may include storing consent data. For example, the consent database 102 may store consent data associated with the consent response (e.g., for the user data requested in the initial data request). In some non-limiting embodiments or aspects, storing the consent data may include storing the consent data in an immutable ledger, as described herein.

In some non-limiting embodiments or aspects, storing the consent data may include codifying at least a portion of the data from the consent response to provide at least a portion of the consent data. For example, the consent database 102 may codify (at least a portion of) the consent response data. Codifying may include tokenizing any sensitive information (e.g., PAN, social security number, etc.). Additionally or alternatively, codifying may include attaching (e.g., by the consent database 102) codification details to each data element of the consent response data to form (at least a portion of) the consent data. In some non-limiting embodiments or aspects, de-identified results of the codification may be stored in the consent database 102 (e.g., in a metrics database of the consent database 102). In some non-limiting embodiments or aspects, the consent database 102 may publish the consent data (e.g., the codified consent response data) to an immutable ledger, as described herein.

As shown in FIG. 1B, at step 151, the process 100*a* may include communicating a data request to the user data database. For example, the requester system 104 may communicate a (second) data request to the user data database 108. In some non-limiting embodiments or aspects, the (second) data request communicated from requester system 104 to user data database 108 may be for the user data associated with the user (e.g., the same user data as requested by the initial data request). Additionally or alternatively, the (second) data request may include an indication that the user has consented to use data database 108 sharing the user data with requester system 104.

As shown in FIG. 1B, at step 152, the process 100a may include communicating a consent verification request. For example, the user data database 108 may communicate a consent verification request to the consent database 102. In some non-limiting embodiments or aspects, the consent verification request may be based on the (second) data request for the user data received by the user data database 108.

In some non-limiting embodiments or aspects, consent database 102 may receive the consent verification request from the user data database 108.

As shown in FIG. 1B, at step 153, the process 100a may include verifying the consent verification request. For example, the consent database 102 may verify the consent verification request based on the (stored) stored consent data (e.g., consent data stored in the immutable ledger).

In some non-limiting embodiments or aspects, verifying the consent verification request may include determining (e.g., by consent database 102) if the consent verification matches the (stored) consent data.

As shown in FIG. 1B, at step 154, the process 100a may include communicating a consent verification response. For example, the consent database 102 may communicate a consent verification response to the user data database 108 based on verifying the consent verification request to the user data database. In some non-limiting embodiments or aspects, the consent verification response may indicate consent from the user to share the user data from the user data database 108 with the requester system 104.

In some non-limiting embodiments or aspects, if the consent verification matches the (stored) consent data, the consent verification response (e.g., communicated by consent database 102) may indicate that the consent verification request is verified. For example, the consent database 102 may communicate a consent verification response indicating that the consent verification request is verified (e.g., completed verification) to the user data database 108. The consent verification request (e.g., completed verification) may indicate that the user has provided appropriate consents to allow the transfer of the requested user data as described in the consent verification request.

As shown in FIG. 1C, at step 155, the process 100a may include communicating a record of fulfillment of the (second) data request. For example, the user data database 108 may communicate a record of fulfillment of the (second) data request to the consent database 102.

In some non-limiting embodiments or aspects, the user data database 108 may communicate the record of fulfillment of the (second) data request in response to receiving the consent verification response.

In some non-limiting embodiments or aspects, the user data database 108 may communicate the record of fulfillment of the (second) data request in response to communicating the user data to requester system 104, as described below with respect to step 156 (e.g., step 155 may be after step 156).

In some non-limiting embodiments or aspects, the record of fulfillment of the (second) data request may include the time of the transfer (e.g., of the user data to requester system 104), the method of the transfer, the components of the transfer, any combination thereof, and/or the like.

As shown in FIG. 1C, at step 156, the process 100a may include communicating user data from the user data database to the requester system. For example, the user data database 108 may communicate the user data to requester system 104.

In some non-limiting embodiments or aspects, in response to receiving the consent verification response, the user data database 108 may fulfill the (second) data request by communicating the user data (e.g., as requested in the second data request) to the requester system 104.

In some non-limiting embodiments or aspects, the consent database 102 may provide direct connectivity between the requester system 104 and the user data database 108 supported by at least one API, as described herein.

In reference to FIG. 1D, shown is a process 100b for consent management according to non-limiting embodiments or aspects of the presently disclosed subject matter. In some non-limiting embodiments or aspects, one or more of the steps of the process 100b may be performed (e.g., completely, partially, and/or the like) by the consent database 102. In some non-limiting embodiments or aspects, one or more of the steps of the process 100b may be performed (e.g., completely, partially, and/or the like) by another system, another device, another group of systems, or another group of devices, separate from or including the consent database 102, such as the requester system 104, the user device 106, and/or the user data database 108. The steps shown in FIG. 1D are for example purposes only. It will be appreciated that additional, fewer, different, and/or a different order of steps may be used in non-limiting embodiments or aspects. The dotted lines shown in FIG. 1D illustrate additional or alternative actions that may be performed at each step.

As shown in FIG. 1D, at step 161, the process 100b may include communicating a consent management request. For example, the user device 106 may communicate a consent management request to user data database 108 (and/or to requester system 104).

In some non-limiting embodiments or aspects, the consent management request may include a user identifier of the user.

In some non-limiting embodiments or aspects, the user device 106 may receive input from the user indicating the user intends to initiate a consent management request. In response to receiving such input, the user device 106 may communicate the consent management request to the user data database 108 (and/or to the requester system 104).

As shown in FIG. 1D, at step 162, the process 100b may include communicating the consent management request to the consent database. For example, user data database 108 (and/or to requester system 104) may communicate the consent management request to consent database 102.

In some non-limiting embodiments or aspects, the consent database 102 may look up consent data associated with the user that is stored by the consent database 102. For example, the consent database 102 may look up consent data associated with the user based on the user identifier.

As shown in FIG. 1D, at step 163, the process 100b may include communicating consent choice data associated with consent data. For example, the consent database 102 may communicate the consent choice data associated with the consent data of the user to the user data database 108 (and/or to the requester system 104).

In some non-limiting embodiments or aspects, the consent choice data may include a listing identifying each item of user data that the user consented to be shared from user data database 108 (and/or shared to requester system 104).

In some non-limiting embodiments or aspects, the consent choice data may include a hosted consent management interface. For example, the consent database 102 may communicate the hosted consent management interface (e.g., a UI, a GUI, at least one web page, and/or the like) to the user data database 108 (and/or to the requester system 104). In some non-limiting embodiments or aspects, the consent database 102 may communicate at least one JSON message to the user data database 108 (and/or to the requester system 104) to render the hosted consent management interface. For example, the JSON message(s) may include at least on JSON object associated with at least one graphical element (e.g., button, checkbox, drop down menu, text box, and/or the like) and/or at least one field for the listing of the item(s) of user data that the user consented to be shared from user data database 108 (and/or shared to requester system 104).

As shown in FIG. 1D, at step 164, the process 100*b* may include communicating consent choice data associated with the consent data to the user device. For example, the user data database 108 (and/or the requester system 104) may communicate the consent choice data associated with the consent data of the user to the user device 106.

In some non-limiting embodiments or aspects, the consent choice data may include a hosted consent management interface, as described herein. Additionally or alternatively, the user device 106 may display the hosted consent management interface.

As shown in FIG. 1D, at step 165, the process 100*b* may include communicating a consent modification request. For example, the user device 106 may communicate the consent modification request to the user data database 108 (and/or to the requester system 104).

In some non-limiting embodiments or aspects, the consent modification request may include a revocation request. For example, the user device 106 may receive input from a user indicating the user revokes consent to sharing the user data. In response to receiving such input, the user device 106 may communicate a revocation request (e.g., indicating that that user revokes a consent associated with the user data) to the user data database 108 (and/or to the requester system 104).

In some non-limiting embodiments or aspects, the consent modification request may include a modification of at least one attribute of the consent to share the user data (e.g., rather than completely revoking consent). For example, the user may consent to share the user data for a primary purpose but revoke consent to share the user data for a secondary purpose. As another example, the use may consent to share the user data for a different duration than originally selected (e.g., a longer duration, a shorter duration, and/or the like).

As shown in FIG. 1D, at step 166, the process 100*b* may include communicating the consent modification request to the consent database. For example, the user data database 108 (and/or the requester system 104) may communicate the consent modification request to the consent database 102.

As shown in FIG. 1D, at step 167, the process 100*b* may include updating the consent data based on the consent modification request. For example, the consent database 102 may update the consent data (e.g., the consent data stored by the consent database 102 associated with the consent response) based on the consent modification request.

In some non-limiting embodiments or aspects, if the consent data is stored in an immutable ledger, updating the consent data may include storing additional consent data in the immutable ledger (e.g., adding a new data record including the additional consent data to the immutable ledger). For example, the additional consent data may indicate that the consent represented by the (originally stored) consent data has been modified and/or may indicate the modification to the (originally stored) consent data. As such, the immutable ledger would still contain both the (originally stored and/or unmodified) consent data and the additional consent data.

In some non-limiting embodiments or aspects, if the consent data is not stored in an immutable ledger, updating the consent data may include modifying the consent data based on the consent modification request.

In some non-limiting embodiments or aspects, if the consent modification request comprises a revocation request, updating the consent data may include revoking the consent to share the user data.

As shown in FIG. 1D, at step 168, the process 100*b* may include communicating an updated consent response. For example, the consent database 102 may communicate an updated consent response based on the updated consent data to the user data database 108 (and/or to the requester system 104).

In some non-limiting embodiments or aspects, the user data database 108 may modify and/or revoke its sharing of the user data (and/or to the requester system 104 may modify and/or revoke its use of the user data) based on the updated consent response.

As shown in FIG. 1D, at step 169, the process 100*b* may include communicating data based on the updated consent response to the user device. For example, the user data database 108 (and/or the requester system 104) may communicate data based on the updated consent response to the user device 106.

In some non-limiting embodiments or aspects, the data based on the updated consent response may include an update to the hosted consent management interface. Additionally or alternatively, the user device 106 may display the update to hosted consent management interface. For example, the update to the hosted consent management interface may indicate that the consent has been successfully modified and/or revoked.

In reference to FIG. 1E, shown is a process 100*c* for consent management according to non-limiting embodiments or aspects of the presently disclosed subject matter. In some non-limiting embodiments or aspects, one or more of the steps of the process 100*c* may be performed (e.g., completely, partially, and/or the like) by the consent database 102. In some non-limiting embodiments or aspects, one or more of the steps of the process 100*c* may be performed (e.g., completely, partially, and/or the like) by another system, another device, another group of systems, or another group of devices, separate from or including the consent database 102, such as the requester system 104, the user device 106, and/or the user data database 108. The steps shown in FIG. 1E are for example purposes only. It will be appreciated that additional, fewer, different, and/or a different order of steps may be used in non-limiting embodiments or aspects. The dotted lines shown in FIG. 1E illustrate additional or alternative actions that may be performed at each step.

As shown in FIG. 1E, at step 171, the process 100*c* may include initiating an audit. For example, the user device 106 (and/or the user data database 108) may initiate an audit. In some non-limiting embodiments or aspects, initiating an audit may include communicating an audit request from the user device 106 to the user data database 108 (and/or the requester system 104). In some non-limiting embodiments or aspects, the user data database 108 may initiate an audit independent of the user device 106.

In some non-limiting embodiments or aspects, the user device 106 may receive input from the user indicating the user intends to initiate an audit. In response to receiving such input, the user device 106 may communicate an audit request to the user data database 108 (and/or to the requester system 104) to initiate the audit.

As shown in FIG. 1E, at step 172, the process 100*c* may include communicating the audit request to the consent database. For example, the user data database 108 (and/or the requester system 104) may communicate the audit request to the consent database 102.

As shown in FIG. 1E, at step 173, the process 100*c* may include retrieving the consent data. For example, the consent database 102 may retrieve the consent data associated with the user from storage (e.g., the immutable ledger).

In some non-limiting embodiments or aspects, the consent database 102 may determine a listing of each item of user data that the user consented to be shared based on retrieving the consent data.

As shown in FIG. 1E, at step 174, the process 100*c* may include requesting utilization data. For example, the consent database 102 may request utilization data from the requester system 104 (and/or the user data database 108). The utilization data may be associated with the use of the user data by the requester system 104 (and/or the user data database 108).

As shown in FIG. 1E, at step 175, the process 100*c* may include receiving the utilization data. For example, the consent database 102 may receive the utilization data from the requester system 104 (and/or the user data database 108).

As shown in FIG. 1E, at step 176, the process 100*c* may include storing and/or analyzing the utilization data. For example, the consent database 102 may store the utilization data. In some non-limiting embodiments or aspects, the consent database 102 may store the utilization data associated with the user data in the immutable ledger.

In some non-limiting embodiments or aspects, analyzing the utilization data may include comparing (e.g., by the consent database 102) the utilization data with the consent data. For example, the consent database 102 may determine compliance of the utilization data to conditions of the consent data based on comparing the utilization data and the consent data. In some non-limiting embodiments or aspects, the consent database 102 may store an indication of compliance (or non-compliance) of the utilization data (e.g., in the immutable ledger).

In some non-limiting embodiments or aspects, the consent database 102 may request and (in response to the request) receive, from the user data database 108, distribution data associated with at least one data access of the user data by the requester system 104. Additionally or alternatively, the consent database 102 may store the distribution data (e.g., in the immutable ledger). In some non-limiting embodiments or aspects, the consent database may compare the distribution data with the consent data. For example, the consent database 102 may determine compliance of the distribution data to conditions of the consent data based on the comparison. In some non-limiting embodiments or aspects, the consent database 102 may store an indication of compliance (or non-compliance) of the distribution data (e.g., in the immutable ledger).

As shown in FIG. 1E, at step 177, the process 100*c* may include communicating an indication of compliance. For example, the consent database 102 may communicate an indication of compliance of the utilization data and/or the distribution data associated with the user data to the user data database 108 (and/or to the requester system 104).

As shown in FIG. 1E, at step 178, the process 100*c* may include communicating the indication of compliance to the user device. For example, the user data database 108 (and/or the requester system 104) may communicate the indication of compliance to the user device 106.

Figure 1F:
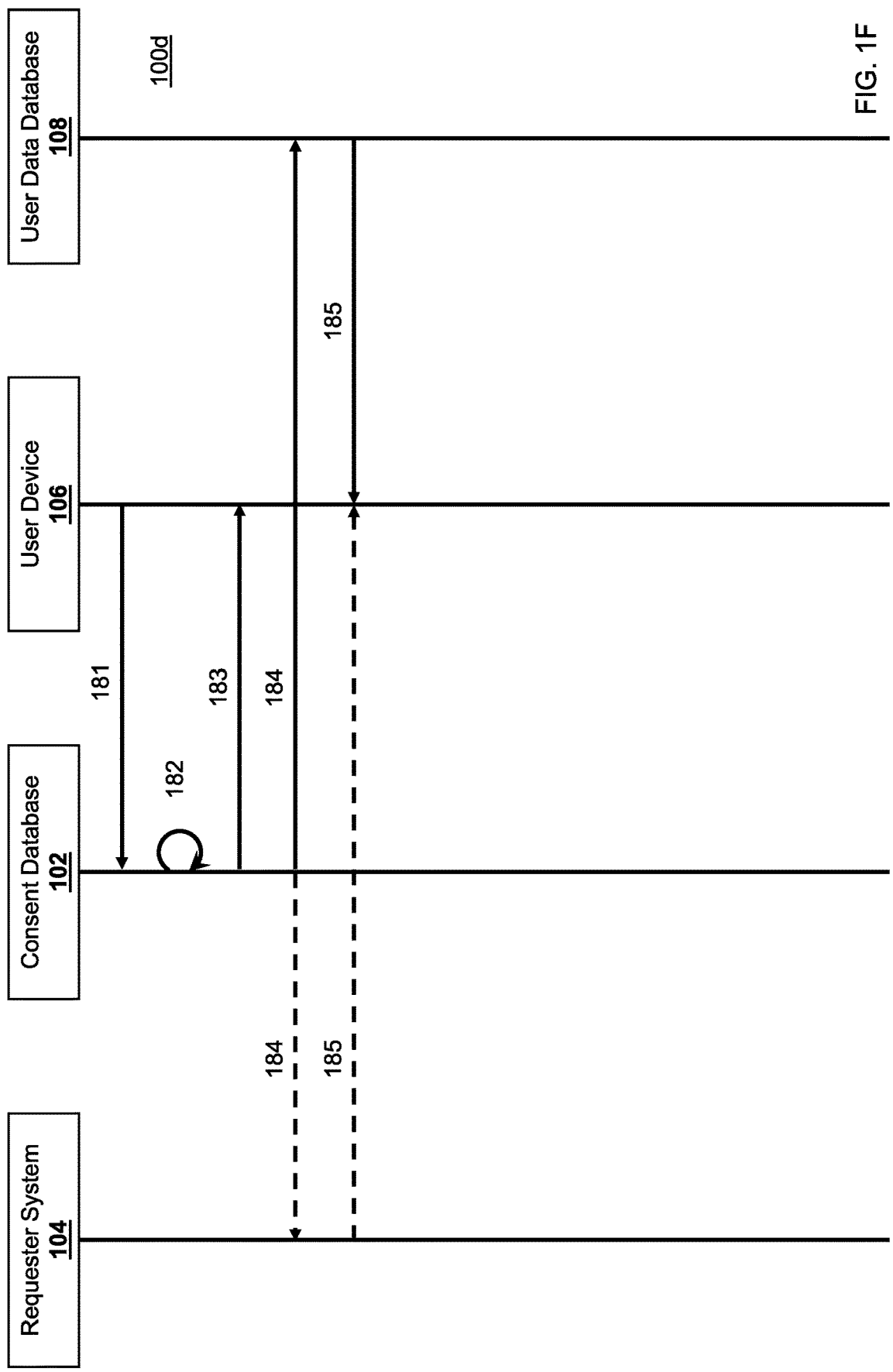

In reference to FIG. 1F, shown is a process 100*d* for consent management according to non-limiting embodiments or aspects of the presently disclosed subject matter. In some non-limiting embodiments or aspects, one or more of the steps of the process 100*d* may be performed (e.g., completely, partially, and/or the like) by the consent database 102. In some non-limiting embodiments or aspects, one or more of the steps of the process 100*d* may be performed (e.g., completely, partially, and/or the like) by another system, another device, another group of systems, or another group of devices, separate from or including the consent database 102, such as the requester system 104, the user device 106, and/or the user data database 108. The steps shown in FIG. 1F are for example purposes only. It will be appreciated that additional, fewer, different, and/or a different order of steps may be used in non-limiting embodiments or aspects. The dotted lines shown in FIG. 1F illustrate additional or alternative actions that may be performed at each step.

As shown in FIG. 1F, at step 181, the process 100*d* may include communicating a request for a digital identifier. For example, the user device 106 may communicate a request for a digital identifier to the consent database 102.

As shown in FIG. 1F, at step 182, the process 100*d* may include generating the digital identifier. For example, the consent database 102 may generate a digital identifier for the user of the user device 106.

In some non-limiting embodiments or aspects, the digital identifier may include a user identifier (e.g., an identification token associated with the user and/or the like).

In some non-limiting embodiments or aspects, the consent database 102 may associate the digital identifier with consent data of the user stored by the consent database 102.

As shown in FIG. 1F, at step 183, the process 100*d* may include communicating with the user device based on the digital identifier. For example, the consent database 102 may communicate the digital identifier to the user device 106. Additionally or alternatively, the consent database 102 may communicate a hosted consent management interface to the user device 106.

As shown in FIG. 1F, at step 184, the process 100*d* may include communicating with at least one of the user data database 108 and/or the requester system 104 based on the digital identifier and/or the consent data stored by the consent database 102.

In some non-limiting embodiments or aspects, the communication based on the consent response and/or the consent verification response, as described herein, may be based on the digital identifier and/or the consent data stored by the consent database 102.

As shown in FIG. 1F, at step 185, the process 100*d* may include communicating with the user device based on the digital identifier. For example, the user data database 108 (and/or the requester system 104) may communicate with the user device 106 based on the digital identifier.

In some non-limiting embodiments or aspects, the communication based on the digital identifier may include communicating a hosted consent management interface. Additionally or alternatively, the user device 106 may display the hosted consent management interface. For example, the hosted consent management interface may include a listing identifying each item of user data that the user consented to be shared based on the digital identifier.

Figure 2A:
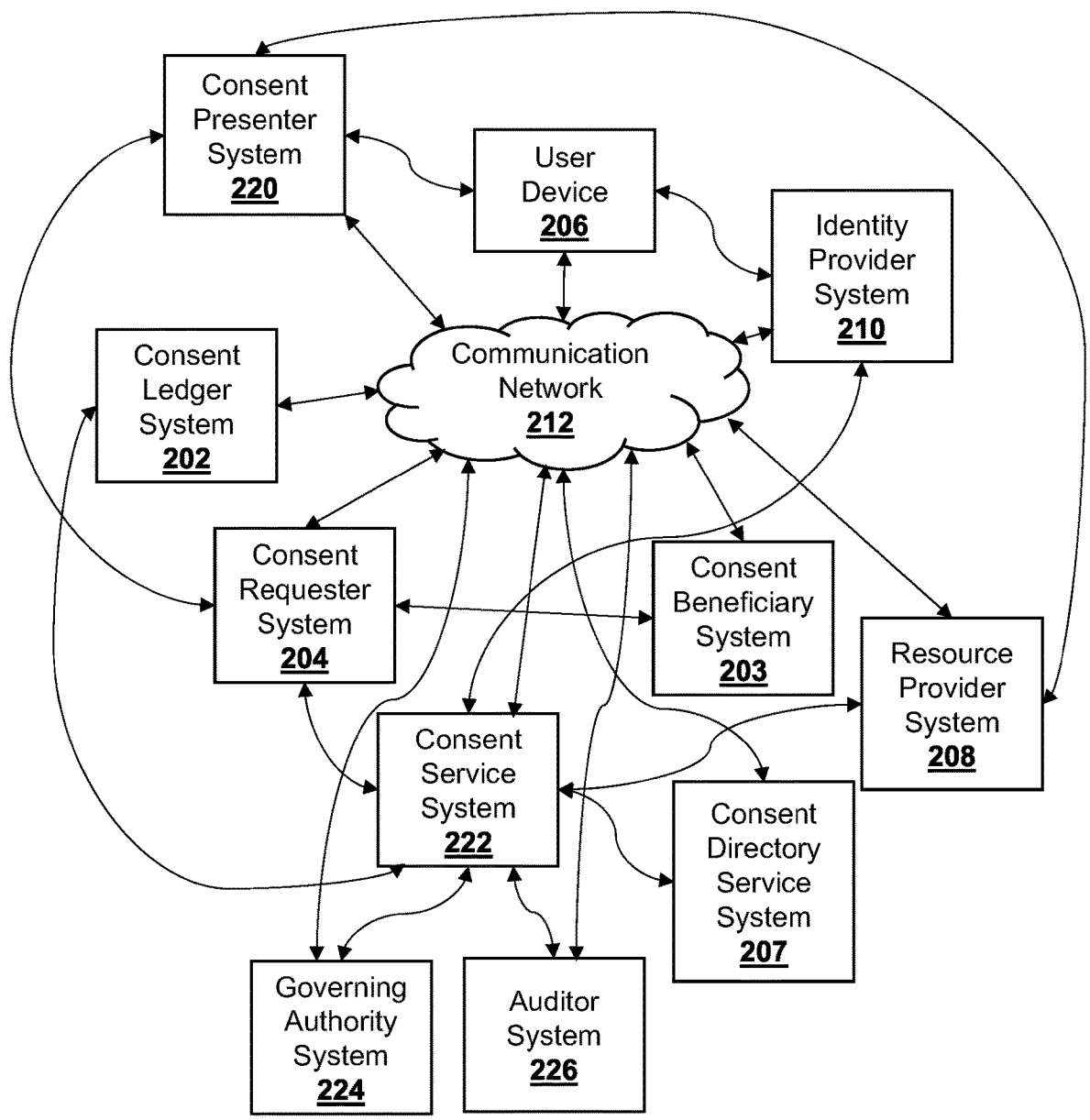
FIG. 2A is a schematic diagram of an exemplary system for consent management, according to the principles of the presently disclosed subject matter.

In reference to FIG. 2A, shown is a system 200 for consent management according to non-limiting embodiments or aspects of the presently disclosed subject matter. The system 200 includes a consent ledger system 202, a consent beneficiary system 203, a consent requester system 204, a user device 206, a consent directory service system 207, a resource provider system 208, an identity provider system 210, a consent presenter system 220, a consent service system 222, a governing authority system 224, an auditor system 226, and/or a communication network 212. The consent ledger system 202, the consent beneficiary system 203, the consent requester system 204, the user device 206, the consent directory service system 207, the resource provider system 208, the identity provider system 210, the consent presenter system 220, the consent service system 222, the governing authority system 224, and/or the auditor system 226 may each include one or more computing devices configured to communicate through one or more communication networks, such as a communication network 212. In some non-limiting embodiments or aspects, at least one of the consent ledger system 202, the consent directory services 207, the consent service system 222, the governing authority system 224, and/or the auditor system 226 may be the same as or similar to the consent database 102. In some non-limiting embodiments or aspects, at least one of the consent beneficiary system 203, the consent requester system 204, and/or the consent presenter system 220 may be the same as or similar to the requester system 104. In some non-limiting embodiments or aspects, at least one of user device 206 and/or the consent presenter system 220 may be the same as or similar to the user device 106. In some non-limiting embodiments or aspects, at least one of the resource provider system 208 and/or the identity provider system 210 may be the same as or similar to the user data database 108. In some non-limiting embodiments or aspects, communication network 212 may be the same as or similar to communication network 112.

In some non-limiting embodiments or aspects, user device 206 may be associated with a user (e.g., an individual, an entity, a fiduciary acting on behalf of an individual or entity). For example, the user may have the right to consent to share user data (e.g., for at least one specified purpose). In some non-limiting embodiments or aspects, the user may include a consumer, a business entity, and/or the like. In some non-limiting embodiments or aspects, a user may (e.g., via user device 206) view consent items, grant consent, revoke consent, renew consent, any combination thereof, and/or the like.

In some non-limiting embodiments or aspects, consent beneficiary system 203 may be associated with at least one consent beneficiary. For example, the consent beneficiary may be a party (e.g., individual, entity, and/or the like) known to the user. In some non-limiting embodiments or aspects, a consent beneficiary may provide a service to users, and the service may rely on personal data from the user. For example, the service may include providing loans, credit cards, bank accounts, etc. to the user, and such service(s) may rely on the credit history of the user. As another example, the service may include a mobile application for purchasing products and/or other services (e.g., subscriptions, delivery services, and/or the like) by the user, and such service(s) may rely on user data associated with the user such as name, address, contact information (e.g., email address, telephone number, etc.), account identifiers, and/or the like. Exemplary consent beneficiaries may include an advertiser, an airline, a rideshare operator, a lender, a financial technology company, an advertising technology company, an aggregator or intermediary, a loyalty platform, and/or the like. In some non-limiting embodiments or aspects, consent beneficiary system 203 may initiate consent requests (e.g., based on a request of the user), maintain (e.g., store) a mapping of the user to at least one consent token, use consent tokens to request consent values, and/or the like, as described herein. In some non-limiting embodiments or aspects, a consent beneficiary may (e.g., via consent beneficiary system 203) view resource providers (e.g., based on the consent context to which the consent beneficiary belongs), request identity providers (e.g., upon selection from the user), authenticate a user (e.g., upon selection from the user), grant consent (e.g., upon user request), revoke consent (e.g., upon user request), renew consent (e.g., upon user request), store at least one consent token, request consent values, view consent items, and/or the like. In some non-limiting embodiments or aspects, a plurality of consent beneficiary systems 203 (e.g., of a plurality of consent beneficiaries) may be associated with a single data request (e.g., multiple consent beneficiaries using the requested data for the same and/or different purposes, one consent beneficiary facilitating transfer of data from a resource provider to a second consent beneficiary, and/or the like).

In some non-limiting embodiments or aspects, consent presenter system 220 may present a UI to the user on behalf of the consent beneficiary system 203. For example, consent presenter system 220 may include a system of an aggregator or intermediary, a consent management platform provider, an open banking provider, and/or the like. Additionally or alternatively, consent presenter system 220 may include user device 106, the operating system thereof, an application thereon, and/or the like.

In some non-limiting embodiments or aspects, consent requester system 204 may perform consent requests (e.g., on behalf of consent beneficiary system 203 and/or the like). For example, consent requester system 204 may receive a consent request from consent beneficiary system 203 and/or communicate the consent request to consent service system 222. In some non-limiting embodiments or aspects, consent requester system 204 may maintain (e.g., store) a mapping of the user to each consent beneficiary and/or each consent token, as described herein. Exemplary consent requesters may include a bank, an open banking provider, an aggregator or intermediary, a marketing company, a financial technology company, an advertising technology company, an operating system, an advertiser, a privacy technology company, and/or the like. In some non-limiting embodiments or aspects, a consent requester may (e.g., via consent requester system 204) view resource providers, request identity providers, authenticate the user (e.g., upon request from the consent beneficiary), grant consent (e.g., upon request from the consent beneficiary), revoke consent (e.g., upon request from the consent beneficiary), renew consent (e.g., upon request from the consent beneficiary), store at least one consent token, request consent values, view consent items, and/or the like.

In some non-limiting embodiments or aspects, consent service system 222 may orchestrate events (e.g., communications) between other systems and/or devices of system 200, as described herein. In some non-limiting embodiments or aspects, consent service system 222 may view resource providers, request identity providers, authenticate the user (e.g., upon request from the consent requestor), grant consent (e.g., upon request from the consent requestor), revoke consent (e.g., upon request from the consent requestor), renew consent (e.g., upon request from the consent requestor), archive consent, delete consent, view consent items, revoke consent (e.g., upon request from the user), analyze consent values and user decisions for a consent beneficiary, and/or the like.

In some non-limiting embodiments or aspects, consent directory system 207 may certify and/or onboard consent requester system(s) 204 and/or identity provider system(s) 210. In some non-limiting embodiments or aspects, consent directory system 207 may maintain (e.g., store) a mapping of consent requestors, consent contexts, and/or consent items, as described herein. In some non-limiting embodiments or aspects, consent directory system 207 may maintain (e.g., store) a mapping of resource provider system(s) 208 to identity provider system(s) 210. In some non-limiting embodiments or aspects, consent directory system 207 may view resource providers, request identity providers, onboard consent requestors, onboard consent beneficiaries, onboard resource providers, onboard identity providers, and/or the like.

In some non-limiting embodiments or aspects, resource provider system 208 stores the user data of the user (e.g., the data requested by the consent beneficiary and/or consent requestor). For example, resource provider system 208 may take action (e.g., share the user data or a portion thereof) based on consent from the user for at least one purpose, as described herein. Exemplary resource provider systems may include a bank, a merchant, a healthcare provider, a mobile device operator, an internet of things (IoT) device operator, and/or the like.

In some non-limiting embodiments or aspects, identity provider system 210 may authenticate the user (e.g., on behalf of resource provider system 208).

In some non-limiting embodiments or aspects, consent ledger system 202 may maintain (e.g., store) an auditable record of every transaction and state change (e.g., every consent request, consent token, and/or the like), as described herein, within the system 200. For example, consent ledger system 202 may include at least one immutable ledger. In some non-limiting embodiments or aspects, consent service system 222 may operate at least one consent ledger system 202. In some non-limiting embodiments or aspects, each resource provider system 208 may be associated with at least one consent ledger system 202.

In some non-limiting embodiments or aspects, governing authority system 224 may be associated with a governing authority (e.g., of the system 200). For example, the governing authority may be responsible for defining rules for the system 200 and/or for the devices and/or systems thereof.

In some non-limiting embodiments or aspects, auditor system 226 may have the ability to perform audits on the system 200 and/or for the devices and/or systems thereof.

The number and arrangement of systems and devices shown in FIG. 2A are provided as an example. There may be additional systems and/or devices, fewer systems and/or devices, different systems and/or devices, and/or differently arranged systems and/or devices than those shown in FIG. 2A. Furthermore, two or more systems or devices shown in FIG. 2A may be implemented within a single system or device, or a single system or device shown in FIG. 2A may be implemented as multiple, distributed systems or devices. Additionally or alternatively, a set of systems (e.g., one or more systems) or a set of devices (e.g., one or more devices) of the system 200 may perform one or more functions described as being performed by another set of systems or another set of devices of the system 200. In some non-limiting embodiments or aspects, consent presenter system 220 may be the same as or part of user device 206. In some non-limiting embodiments or aspects, at least two of consent presenter system 220, consent beneficiary system 203, and/or consent requester system 204 may the same system and/or part(s) of the same system. In some non-limiting embodiments or aspects, at least two of consent service system 222, consent directory service system 207, and/or consent ledger system 202 may be the same system and/or part(s) of the same system. In some non-limiting embodiments or aspects, identity provider system 210 and/or resource provider system 208 may be the same system and/or part(s) of the same system. In some non-limiting embodiments or aspects, consent presenter system 220, consent beneficiary system 203, consent requestor system 204, identity provider system 210, and resource provider system 208 may be the same system and/or part(s) of the same system (e.g., a merchant requesting consent to use user data stored on a separate part of the merchant's system to provide a new service to the user).

The user may request the service through a user device 206 that may be the same as or similar to the user device 106 in FIG. 1A. The user device 206 may communicate the service request to a consent beneficiary system 203. The consent beneficiary system 203 may determine that the service requested in the service request requires the use of personal data from the user. The consent beneficiary system 203 may then send a consent request to a consent requester system 204. The consent beneficiary system 203 and/or the consent requester system 204 may be the same as or similar to the requester system 104 of FIG. 1A. The consent requester system 204 may be the same or a different system than the consent beneficiary system 203. The consent requester system 204 may determine the data user consents required to complete the consent request. The consent requester system 204 may communicate a provider request to a consent service system 222 to provide a list of providers that may have access to, or that may store, the user data requested in the consent request.

With continued reference to FIG. 2A, in some non-limiting embodiments or aspects, in response to receiving the provider request, the consent service system 222 may communicate the provider request to a consent directory service system 207. The consent directory service system 207 may determine if the consent request matches the user data requested. The consent directory service system 207 may determine a list of resource provider system 208 that store the user data requested in the consent request. The consent directory service system 207 may communicate the list of resource provider systems to a consent presenter system 220.

With continued reference to FIG. 2A, in some non-limiting embodiments or aspects, the consent presenter system 220 may display the list of resource provider system 208 to the user through a UI display on the user device 206. The user may select one or more resource provider system 208 that the user grants consent to the consent beneficiary system 203 to gain access from for their relevant user data. The consent presenter system 220 may communicate the selected resource provider system 208 to the consent service system 222.

With continued reference to FIG. 2A, in some non-limiting embodiments or aspects, the consent service system 222 may communicate with the consent directory service system 207 to determine how each selected resource provider system 208 requires the identity of the user to be authenticated. The consent directory service system 207 may communicate to the user through the user device 206 instructing the user to authenticate their identity based on the requirements of the resource provider system 208. The user may authenticate their identity with an identity provider system 210 based on the requirements of the resource provider system 208. Upon authentication of the identity of the user, the identity provider system 210 may communicate an identification (ID) token to the consent service system 222 which indicates that the user's identity has been authenticated.

With continued reference to FIG. 2A, in some non-limiting embodiments or aspects, once the consent service system 222 receives the ID token, the consent service system 222 may communicate a consent token request to a consent ledger system 202. The consent token request may include the ID token, identity of the consent beneficiary system 203, identity of the consent requester system 204, identity of the selected resource provider system 208, the user data being requested, purpose of the data use, volume of the user data requested, duration of the request, frequency of the request, and/or the like.

With continued reference to FIG. 2A, in some non-limiting embodiments or aspects, in response to receiving the consent token request, the consent ledger system 202 may log the event in the consent ledger system 202. The consent ledger system 202 may verify that the consent token request does not violate the consent granted by the user. If the consent token request matches the user consent, the consent ledger system 202 may communicate a consent token to the consent requester system 204.

With continued reference to FIG. 2A, in some non-limiting embodiments or aspects, the consent requester system 204 may store the consent token. The consent requester system 204 may then communicate the consent token to the consent beneficiary system 203. The consent beneficiary system 203 may then store the consent token and communicate the consent token to the relevant resource provider system 208 that was granted consent by the user to receive the consented user data. In response to the receipt of the consent token, the resource provider system 208 may communicate the consented user data to the consent beneficiary system 203.

With continued reference to FIG. 2A, in some non-limiting embodiments or aspects, the aforementioned devices and/or systems may communicate by at least one communication network 212, which may be the same as or similar to communication network 112.

With continued reference to FIG. 2A, in some non-limiting embodiments or aspects, an action may be taken on behalf of a user (e.g., in addition to, in lieu of, or as part of sharing and/or using user data). For example, consent beneficiary system 203 may automatically take action on behalf of the user, e.g., in response to receiving the consent token and/or consent value(s). For example, consent beneficiary system 203 may instruct and/or control at least one device and/or system (which may be part of and/or separate from consent beneficiary system 203) to perform an action (e.g., unlock a smart lock on a door to allow a delivery to be placed inside, allow a connected car to initiate proximity-based payments, etc.) based on consent from the user (e.g., consent token and/or consent value(s) associated with the user). For example, the consent value(s) may include data (e.g., identifiers, account identifiers, payment tokens, authentication data, internet address data, and/or the like) that enables the consent beneficiary system 203 to communicate with, instruct, and/or control such devices.

Figure 2B:
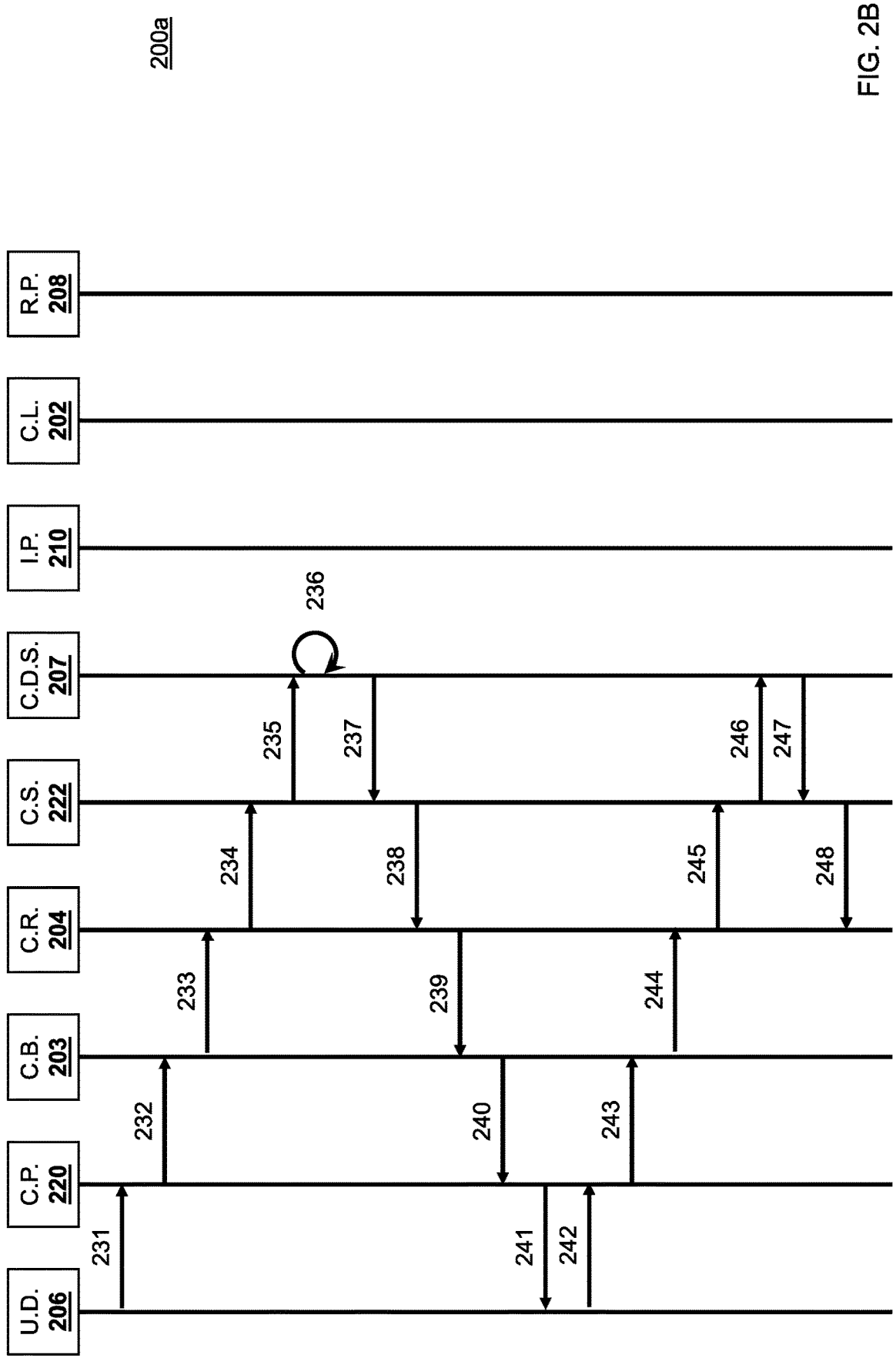

In reference to FIGS. 2B-2D, shown is a process 200a for consent management according to non-limiting embodiments or aspects of the presently disclosed subject matter. In some non-limiting embodiments or aspects, one or more of the steps of the process 200a may be performed (e.g., completely, partially, and/or the like) by the consent service system 222. In some non-limiting embodiments or aspects, one or more of the steps of the process 200a may be performed (e.g., completely, partially, and/or the like) by another system, another device, another group of systems, or another group of devices, separate from or including the consent service system 222, such as the consent ledger system 202, the consent beneficiary system 203, the consent requester system system 208, the identity provider system 210, the consent presenter system 220, the governing authority system 224, and/or the auditor system 226. The steps shown in FIGS. 2B-2D are for example purposes only. It will be appreciated that additional, fewer, different, and/or a different order of steps may be used in non-limiting embodiments or aspects.

As shown in FIG. 2B, at step 231, the process 200a may include communicating a service request. For example, the user device 206 may communicate a service request to the consent presenter system 220.

In some non-limiting embodiments or aspects, the user device may display a UI (e.g., GUI). For example, the user device 206 may receive input from the user via the UI to request a service (e.g., from a consent beneficiary system 203 and/or the like).

In some non-limiting embodiments or aspects, the consent presenter system 220 may receive the service request from the user via a UI (e.g., GUI) displayed on the user device 206 of the user.

As shown in FIG. 2B, at step 232, the process 200a may include communicating the service request. For example, the consent presenter system 220 may communicate the service request to the consent beneficiary system 203.

As shown in FIG. 2B, at step 233, the process 200a may include communicating a data request. For example, the consent beneficiary system 203 may communicate a data request to the consent requester system 204 based on receiving the service request.

In some non-limiting embodiments or aspects, the data request may include at least one consent item associated with user data. For example, each consent item may be associated with a type (e.g., category) of user data. In some non-limiting embodiments or aspects, each consent item may include at least one of consent item type data associated with a type of the consent item, duration data associated a duration of the consent item, time range data associated a time range of the consent item, frequency data associated a frequency of how often the consent item will be requested, time span data associated with a time span of the consent item, consent state data associated with a state of the consent item, consent status data associated with a status of the consent item, primary purpose data associated with at least one primary purpose for which the consent item will be used, secondary purpose data associated with at least one secondary purpose for which the consent item will be use, the at least one secondary purpose different than the at least one primary purpose, any combination thereof, and/or the like. In some non-limiting embodiments or aspects, the consent state may be granted or revoked. In some non-limiting embodiments or aspects, the consent status may be one of active (e.g., the consent values for the consent item may be requested), archived (e.g., the consent item is no longer active), deleted, initiated (e.g., the consent item has been created but consent has not yet been granted), paused (e.g., the consent item is temporarily disabled), revoked, consumed (e.g., has been used and is not reusable), expired (e.g., not longer valid because the consent item has met or exceeded its expiration date), and/or the like. In some non-limiting embodiments or aspects, the frequency may be streaming (e.g., continuously available), periodic (e.g., available at specified intervals, such as daily, weekly, monthly, yearly, and/or the like), on-demand (e.g., available upon initiation/request of the user), context-based (e.g., available when an event stipulated in the (primary or secondary) purpose occurs), single-use, and/or the like. In some non-limiting embodiments or aspects, the time span may be a point in time (e.g., an account balance at the time of a transaction), for a selected time period (e.g., one day of data, one week of data, one month of data, one year of data, and/or the like), and/or the like. In some non-limiting embodiments or aspects, the consent item type is a type of the consent item (e.g., web browsing history, payment transactions, bank transactions, personal information, and/or the like).

In some non-limiting embodiments or aspects, only certain parties (e.g., types of parties, categories of parties, and/or the like) may be permitted to request certain types of consent items. The parties (e.g., types of parties, categories of parties, and/or the like) permitted to request such consent items may be based on a consent context associated with the consent item type(s). For example, each consent context may include a name (and/or identifier) and a set of one or more consent items types associated with the consent context. Additionally or alternatively, each consent context may include and/or be associated with a set of one or more consent requester systems 204 and/or a second of one or more consent requesters types permitted to request the consent items types associated with the consent context.

As shown in FIG. 2B, at step 234, the process 200a may include communicating the data request to the consent service system. For example, the consent requester system 204 may communicate the data request to the consent service system 222. Additionally or alternatively, the consent requester system 204 may request an identification of at least one resource provider system 208 from the consent service system 222 based on the data request (e.g., the consent items thereof).

As shown in FIG. 2B, at step 235, the process 200a may include communicating the data request to the consent directory service system. For example, the consent services system 222 may communicate the data request to the consent directory service system 207. Additionally or alternatively, the consent services system 222 may request an identification of at least one resource provider system 208 from the consent directory service system 207 based on the data request (e.g., the consent items thereof).

As shown in FIG. 2B, at step 236, the process 200a may include determining resource provider identification data. For example, the consent directory service system 207 may determine resource provider identification data associated with at least one resource provider system 208 storing the user data requested in the data request.

In some non-limiting embodiments or aspects, consent directory service system 207 may determine one or more resource provider systems 208 based on the resource provider system(s) 208 being associated with the consent item type(s) of the consent item(s) of the data request.

In some non-limiting embodiments or aspects, consent directory service system 207 may verify that the consent item(s) (e.g., the consent item type(s) of the consent items) correspond to the consent context of the consent requester system 204. For example, consent directory service system 207 may verify this correspondence based on a mapping of consent requestors (and/or types of consent requestors), consent contexts, and/or consent items maintained (e.g., stored) by consent directory service system 207.

As shown in FIG. 2B, at step 237, the process 200a may include communicating the resource provider identification data. For example, the consent directory service system 207 may communicate the resource provider identification data to the consent service system 222.

As shown in FIG. 2B, at step 238, the process 200a may include communicating the resource provider identification data. For example, the consent service system 222 may communicate the resource provider identification data to the consent requester system 204.

As shown in FIG. 2B, at step 239, the process 200a may include communicating the resource provider identification data. For example, the consent requester system 204 may communicate the resource provider identification data to the consent beneficiary system 203.

As shown in FIG. 2B, at step 240, the process 200a may include communicating the resource provider identification data. For example, the consent beneficiary system 203 may communicate the resource provider identification data to the consent presenter system 220.

As shown in FIG. 2B, at step 241, the process 200a may include communicating the resource provider identification data. For example, the consent presenter system 220 may communicate the resource provider identification data to the user device 206.

As shown in FIG. 2B, at step 242, the process 200a may include communicating resource provider selection data. For example, the user device 206 may communicate the resource provider selection data associated with a selection of a resource provider system 208 to the consent presenter system 220.

In some non-limiting embodiments or aspects, the user device may display a UI (e.g., GUI) including at least one identifier of the resource provider system(s) 208 identified by the resource provider identification data. For example, the user device 206 may receive input from the user via the UI to select one of the resource provider system(s) 208 displayed. In some non-limiting embodiments or aspects, the user device 206 may communicate the resource provider selection data to the consent presenter system 220 based on the input selecting the (one of the) resource provider system(s) 208.

As shown in FIG. 2B, at step 243, the process 200a may include communicating the resource provider selection data. For example, the consent presenter system 220 may communicate the resource provider selection data to the consent beneficiary system 203.

As shown in FIG. 2B, at step 244, the process 200a may include communicating the resource provider selection data. For example, the consent beneficiary system 203 may communicate the resource provider selection data to the consent requester system 204.

As shown in FIG. 2B, at step 245, the process 200a may include communicating the resource provider selection data. For example, the consent requester system 204 may communicate the resource provider selection data to the consent service system 222.

As shown in FIG. 2B, at step 246, the process 200a may include communicating the resource provider selection data. For example, the consent service system 222 may communicate the resource provider selection data to the consent directory system 207.

As shown in FIG. 2B, at step 247, the process 200a may include communicating identity provider identification data. For example, the consent directory service system 207 may communicate the identity provider identification data associated with at least one identity provider system 210 authorized to authenticate the identity of the user to consent service system 222.

In some non-limiting embodiments or aspects, consent directory system 207 may maintain (e.g., store) a mapping of resource provider system(s) 208 to identity provider system(s) 210, as described herein. Additionally or alternatively, the consent directory service system 207 may communicate the identity provider identification data associated with the at least one identity provider system 210 authorized to authenticate the identity of the user based on the mapping of resource provider system(s) 208 to identity provider system(s) 210.

As shown in FIG. 2B, at step 248, the process 200a may include communicating the identity provider identification data. For example, the consent service system 222 may communicate the identity provider identification data to the consent requester system 204.

As shown in FIG. 2C, at step 249, the process 200a may include communicating the identity provider identification data. For example, the consent requester system 204 may communicate the identity provider identification data to the consent beneficiary system 203.

As shown in FIG. 2C, at step 250, the process 200a may include communicating the identity provider identification data. For example, the consent beneficiary system 203 may communicate the identity provider identification data to the consent presenter system 220.

As shown in FIG. 2C, at step 251, the process 200a may include rendering an authentication user interface. For example, the consent presenter system 220 may render an authentication user interface for display on user device 206.

As shown in FIG. 2O, at step 252, the process 200a may include communicating and/or displaying the authentication user interface. For example, the user device 206 may receive the authentication user interface from consent presenter system 220 and/or display the authentication user interface.

As shown in FIG. 2C, at step 253, the process 200a may include communicating authentication data. For example, the user device 206 may communicate authentication data to consent presenter system 220 (e.g., based on input from the user received via the authentication user interface).

As shown in FIG. 2C, at step 254, the process 200a may include communicating the authentication data. For example, the consent presenter system 220 may communicate the authentication data to the identity provider system 210.

As shown in FIG. 2C, at step 255, the process 200a may include communicating an ID token. For example, the identity provider system 210 may communicate an ID token to the consent presenter system 220 based on receiving the authentication data.

In some non-limiting embodiments or aspects, the identity provider system 210 may generate the ID token based on receiving the authentication data. In some non-limiting embodiments or aspects, the ID token may include an indication of (e.g., a reference to) a successful authentication (e.g., identity verification) by the identity provider system 210 of the user, a type of the identity verification performed, a signature (and/or certificate and/or the like) proving the authentication (e.g., proving the authenticity of the ID token purportedly being provided by the identity provider system 210), any combination thereof, and/or the like.

As shown in FIG. 2C, at step 256, the process 200a may include communicating the ID token. For example, the consent presenter system 220 may communicate the ID token to user device 206.

As shown in FIG. 2C, at step 257, the process 200a may include communicating a consent request. For example, the consent presenter system 220 may communicate a consent request including the ID token and the consent items (e.g., from the data request) to the consent beneficiary system 203.

As shown in FIG. 2C, at step 258, the process 200a may include communicating the consent request. For example, the consent beneficiary system 203 may communicate the consent request to the consent requester system 204.

As shown in FIG. 2C, at step 259, the process 200a may include communicating the consent request. For example, the consent requester system 204 may communicate the consent request to the consent service system 222.

As shown in FIG. 2C, at step 260, the process 200a may include communicating the consent request. For example, the consent service system 222 may communicate the consent request to the consent ledger system 207.

In some non-limiting embodiments or aspects, the consent request may include a consent token request.

As shown in FIG. 2C, at step 261, the process 200a may include communicating a consent token. For example, the consent ledger system 207 may communicate a consent token to the consent service system 222 based on the consent request (e.g., the consent token request).

In some non-limiting embodiments or aspects, the consent ledger system 207 may generate the consent token based on the consent request (e.g., the consent token request). In some non-limiting embodiments or aspects, the consent token may include a consent identifier (e.g., a unique identifier for the consent token), the user ID token, at least one consent beneficiary identifier (e.g., associated with the consent beneficiary system(s) 203 that communicated the data request and/or the consent request), a resource provider identifier (e.g., associated with the resource provider system 208 selected by the user), the consent items, jurisdiction data (e.g., data indicating the countries or geographic regions in which the consent token is valid), any combination thereof, and/or the like.

In some non-limiting embodiments or aspects, the consent ledger system 207 may store consent data based on the consent request, the consent token, any combination thereof, and/or the like. For example, the consent ledger system 207 may stored consent data in an immutable ledger and/or the like.

As shown in FIG. 2C, at step 262, the process 200a may include communicating the consent token. For example, the consent service system 222 may communicate the consent token to the consent requester system 204.

As shown in FIG. 2C, at step 263, the process 200a may include communicating the consent token. For example, the consent requester system 204 may communicate the consent token to the consent beneficiary system 203.

As shown in FIG. 2C, at step 264, the process 200a may include storing the consent token. For example, the consent beneficiary system 203 may store the consent token.

As shown in FIG. 2C, at step 265, the process 200a may include communicating the consent token. For example, the consent beneficiary system 203 may communicate at least one communication including the consent token to the resource provider system 208.

In some non-limiting embodiments or aspects, the consent beneficiary system 203 may communicate a fetch request comprising the consent token, additional parameters, any combination thereof, and/or the like to the resource provider system 208.

As shown in FIG. 2D, at step 266, the process 200a may include communicating a token validation request. For example, the resource provider system 208 may communicate a token validation request based on the consent token to the consent service system 222. In some non-limiting embodiments or aspects, the token validation request may include the consent token.

As shown in FIG. 2D, at step 267, the process 200a may include communicating a token validation response. For example, the consent service system 222 may communicate a token validation response to the resource provider system 208.

In some non-limiting embodiments or aspects, the token validation response may indicate whether or not the consent token is valid. For example, the token validation response may indicate that the consent token is valid. Alternatively, the token validation response may indicate that the consent token is invalid (e.g., the consent token does not match a consent token previously communicated by the consent service system 222 and/or stored in the consent ledger system 207).

As shown in FIG. 2D, at step 268, the process 200a may include communicating at least one consent value. For example, the resource provider system 208 may communicate at least one consent value to consent beneficiary system 203 (e.g., via an API and/or the like) based on the communication that included the consent token (e.g., the fetch request).

In some non-limiting embodiments or aspects, the consent value(s) may include (at least a portion of) the user data stored by the resource provider system 208. For example, the consent value(s) may include the user data associated with each consent item. As such, the resource provider system 208 may communicate at least one consent value for each consent item of the at least one consent item, and each consent value may include at least a portion of the user data.

In some non-limiting embodiments or aspects, an action may be taken on behalf of a user (e.g., in addition to, in lieu of, or as part of sharing and/or using user data). For example, consent beneficiary system 203 may automatically take action on behalf of the user, e.g., in response to receiving the consent token and/or consent value(s). For example, consent beneficiary system 203 may instruct and/or control at least one device and/or system (which may be part of and/or separate from consent beneficiary system 203) to perform an action (e.g., unlock a smart lock on a door to allow a delivery to be placed inside, allow a connected car to initiate proximity-based payments, etc.) based on consent from the user (e.g., consent token and/or consent value(s) associated with the user). For example, the consent value(s) may include data (e.g., identifiers, account identifiers, payment tokens, authentication data, internet address data, and/or the like) that enables the consent beneficiary system 203 to communicate with, instruct, and/or control such devices.

In reference to FIG. 2E, shown is a process 200b for consent management according to non-limiting embodiments or aspects of the presently disclosed subject matter. In some non-limiting embodiments or aspects, one or more of the steps of the process 200b may be performed (e.g., completely, partially, and/or the like) by the consent service system 222. In some non-limiting embodiments or aspects, one or more of the steps of the process 200b may be performed (e.g., completely, partially, and/or the like) by another system, another device, another group of systems, or another group of devices, separate from or including the consent service system 222, such as the consent ledger system 202, the consent beneficiary system 203, the consent requester system 204, the user device 206, the consent directory service system 207, the resource provider system 208, the identity provider system 210, the consent presenter system 220, the governing authority system 224, and/or the auditor system 226. The steps shown in FIG. 2E are for example purposes only. It will be appreciated that additional, fewer, different, and/or a different order of steps may be used in non-limiting embodiments or aspects.

As shown in FIG. 2E, at step 270, the process 200b may include communicating a modification request. For example, the user device 206 may communicate, to at least one selected system, a modification request (e.g., a revocation request, a renewal request, and/or the like). For example, the selected system may include at least one of consent presenter system 220, consent beneficiary system 203, consent requester system 204, consent service system 222, resource provider system 208, or any combination thereof.

In some non-limiting embodiments or aspects, the modification request may be associated with at least one consent item for which the user previously granted consent to share. In some non-limiting embodiments or aspects, the modification request may be associated with all consent items for which the user previously granted consent to share. In some non-limiting embodiments or aspects, the modification request may not be specific to any particular consent item(s).

In some non-limiting embodiments or aspects, the user device 206 may communicate the modification request in response to input from the user (e.g., indicating the user intends to initiate the modification request).

As shown in FIG. 2E, at step 271, the process 200b may include identifying the user. For example, the selected system(s) may identify the user based on the modification request received from the user device 206.

In some non-limiting embodiments or aspects, the modification request may include the ID token of the user, as described herein. Additionally or alternatively, the selected system(s) may identify the user based on the ID token.

In some non-limiting embodiments or aspects, the selected system(s) may identify the user based on the user authenticating with at least one identity provider system 210, as described herein.

As shown in FIG. 2E, at step 272, the process 200b may include retrieving consent tokens and/or consent items. For example, the selected system(s) may retrieve (e.g., search for and/or load) the consent tokens and/or consent items for which the user previously granted consent to share from a local data storage of the selected system(s). Additionally or alternatively, the selected system(s) may retrieve (e.g., request and/or receive) the consent tokens and/or consent items for which the user previously granted consent to share from consent ledger system 202.

As shown in FIG. 2E, at step 273, the process 200b may include communicating the consent tokens and/or consent items. For example, the selected system(s) may communicate, to the user device 206, the consent tokens and/or consent items for which the user previously granted consent to share.

As shown in FIG. 2E, at step 274, the process 200b may include communicating a selection of at least one consent token and/or consent item. For example, the user device 206 may communicate, to the selected system(s), a selection of at least one consent token and/or consent item that the user has selected for modification (e.g., revocation, renewal, and/or the like). Additionally or alternatively, the user device 206 may communicate at least one desired modification (e.g., revocation, renewal, and/or the like) for each consent token and/or consent item of the selection.

In some non-limiting embodiments or aspects, the user device 206 may communicate the selection request in response to input from the user (e.g., indicating the user selects the at least one consent token and/or consent item).

As shown in FIG. 2E, at step 275, the process 200b may include communicating the selection (and/or the desired modification(s)). For example, the selected system(s) may communicate the selection (and/or the desired modification(s)) to consent service system 222.

As shown in FIG. 2E, at step 276, the process 200b may include communicating the selection (and/or the desired modification(s)). For example, the consent service system 222 may communicate the selection (and/or the desired modification(s)) to the consent ledger system 207.

As shown in FIG. 2E, at step 277, the process 200b may include modifying the selected consent token(s) and/or consent item(s). For example, the consent ledger system 207 may modify the selected consent token(s) and/or consent item(s) (e.g., from the selection) based on the desired modification(s). Additionally or alternatively, if the consent ledger system 207 stores the consent tokens and/or consent items in an immutable ledger, the consent ledger system 207 may store an additional data record indicating the modification(s) to the previously stored consent token(s) and/or consent item(s).

As shown in FIG. 2E, at step 278, the process 200b may include communicating a confirmation message. For example, the consent ledger system 207 may communicate the confirmation message indicating the selected consent token(s) and/or consent item(s) have been modified to consent service system 222.

In some non-limiting embodiments or aspects, the consent message may include a list of the consent token(s) and/or consent item(s) and the corresponding state(s) thereof.

As shown in FIG. 2E, at step 279, the process 200b may include communicating the confirmation message. For example, the consent service system 222 may communicate the confirmation message to the selected system(s).

As shown in FIG. 2E, at step 280, the process 200b may include communicating the confirmation message. For example, the selected system(s) may communicate the confirmation message to the user device 206.

Figure 3:
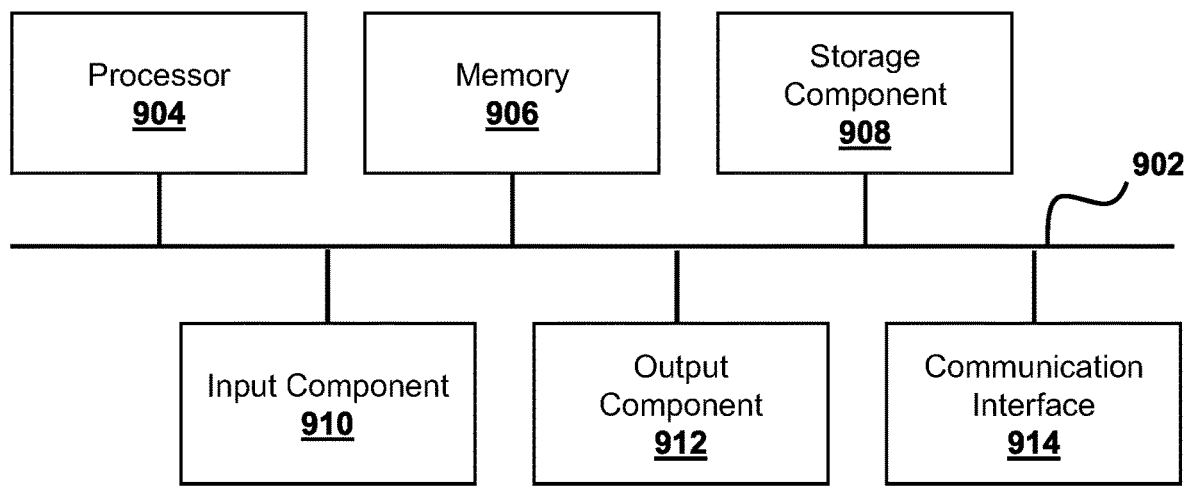
FIG. 3 is a schematic diagram of an exemplary computing device, according to non-limiting embodiments or aspects of the presently disclosed subject matter.

Referring now to FIG. 3, shown is a diagram of example components of a computing device 900 for implementing and performing the systems and methods described herein according to non-limiting embodiments. The computing device 900 may refer to the consent database 102, requester system 104, user device 106, or user data database 108 shown in FIG. 1A and/or the consent ledger system 202, consent beneficiary system 203, consent requester system 204, user device 206, consent directory service system 207, resource provider system 208, identity provider system 210, consent presenter system 220, consent service system 222, governing authority system 224, or auditor system 226 shown in FIG. 2A. In some non-limiting embodiments or aspects, device 900 may include additional components, fewer components, different components, or differently arranged components than those shown in FIG. 3. Device 900 may include a bus 902, a processor 904, memory 906, a storage component 908, an input component 910, an output component 912, and a communication interface 914. Bus 902 may include a component that permits communication among the components of device 900. In some non-limiting embodiments or aspects, processor 904 may be implemented in hardware, firmware, or a combination of hardware and software. For example, processor 904 may include a processor (e.g., a central processing unit (CPU), a graphics processing unit (GPU), an accelerated processing unit (APU), etc.), a microprocessor, a digital signal processor (DSP), and/or any processing component (e.g., a field-programmable gate array (FPGA), an application-specific integrated circuit (ASIC), virtual or augmented reality depicting systems and devices, etc.) that can be programmed to perform a function. Memory 906 may include random access memory (RAM), read only memory (ROM), and/or another type of dynamic or static storage device (e.g., flash memory, magnetic memory, optical memory, etc.) that stores information and/or instructions for use by processor 904.

With continued reference to FIG. 3, storage component 908 may store information and/or software related to the operation and use of device 900. For example, storage component 908 may include a hard disk (e.g., a magnetic disk, an optical disk, a magneto-optic disk, a solid-state disk, etc.) and/or another type of computer-readable medium. Input component 910 may include a component that permits device 900 to receive information, such as via user input (e.g., a touch screen display, a keyboard, a keypad, a mouse, a button, a switch, a microphone, etc.). Additionally, or alternatively, input component 910 may include a sensor for sensing information (e.g., a global positioning system (GPS) component, an accelerometer, a gyroscope, an actuator, etc.). Output component 912 may include a component that provides output information from device 900 (e.g., a display, a speaker, one or more light-emitting diodes (LEDs), etc.). Communication interface 914 may include a transceiver-like component (e.g., a transceiver, a separate receiver and transmitter, etc.) that enables device 900 to communicate with other devices, such as via a wired connection, a wireless connection, or a combination of wired and wireless connections. Communication interface 914 may permit device 900 to receive information from another device and/or provide information to another device. For example, communication interface 914 may include an Ethernet interface, an optical interface, a coaxial interface, an infrared interface, a radio frequency (RF) interface, a universal serial bus (USB) interface, a Wi-Fi® interface, a cellular network interface, and/or the like.

Device 900 may perform one or more processes described herein. Device 900 may perform these processes based on processor 904 executing software instructions stored by a computer-readable medium, such as memory 906 and/or storage component 908. A computer-readable medium may include any non-transitory memory device. A memory device includes memory space located inside of a single physical storage device or memory space spread across multiple physical storage devices. Software instructions may be read into memory 906 and/or storage component 908 from another computer-readable medium or from another device via communication interface 914. When executed, software instructions stored in memory 906 and/or storage component 908 may cause processor 904 to perform one or more processes described herein. Additionally, or alternatively, hardwired circuitry may be used in place of or in combination with software instructions to perform one or more processes described herein. Thus, embodiments described herein are not limited to any specific combination of hardware circuitry and software. The term "programmed or configured," as used herein, refers to an arrangement of software, hardware circuitry, or any combination thereof on one or more devices.

Figure 4A:
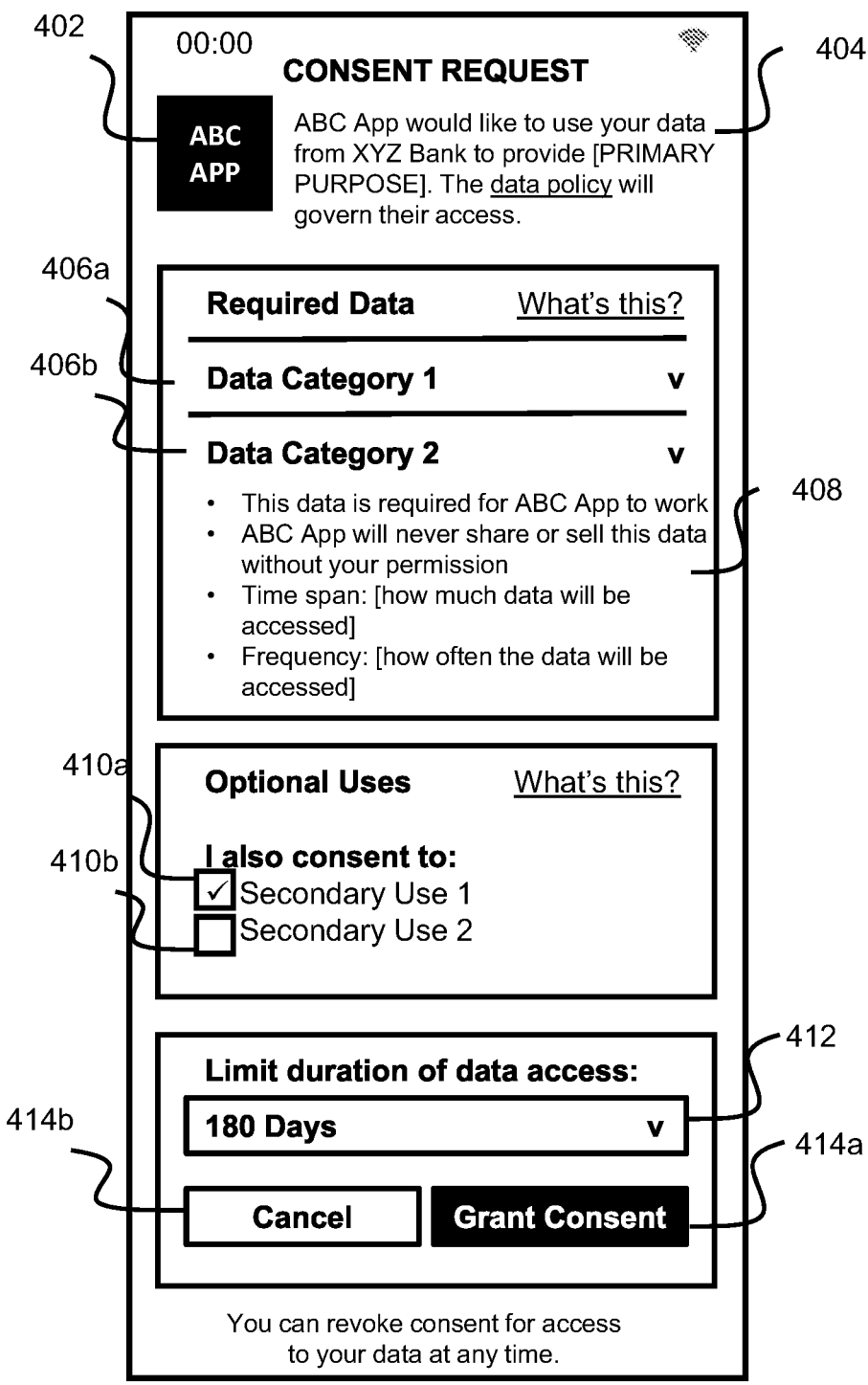
FIGS. 4A and 4B are screenshots of an exemplary graphical user interface, according to non-limiting embodiments or aspects of the presently disclosed subject matter.

In reference to FIG. 4A, shown is an exemplary GUI 400a for consent management according to non-limiting embodiments or aspects of the presently disclosed subject matter. For the purpose of illustration, the GUI 400a may be an example of a GUI to grant consent (e.g., when consent to share consent items has not yet been granted).

As shown in FIG. 4A, GUI 400a may include logo 402 of the consent beneficiary. The text 404 of GUI 400a may identify the consent beneficiary (e.g., ABC App), the resource provider (e.g., XYZ Bank), and/or the primary purpose for requesting consent. Additionally or alternatively, the text 404 may also include a link to the data policy that will govern access to the user data associated with the consent items.

With continued reference to FIG. 4A, dropdown menus 406a, 406b may identify the consent item(s) (e.g., Data Category 1, Data Category 2) that are associated with the consent request. Selecting the dropdown arrows of dropdown menus 406a, 406b may provide additional information regarding the consent items. Text 408 may describe why the consent item(s) are being requested (e.g., the data is required for ABC App to work), whether the data associated with the consent item(s) will be shared or sold, the time span for the consent item(s), and/or the frequency of the consent item(s).

With continued reference to FIG. 4A, checkboxes 410a, 410b identify at least one secondary purpose (e.g., Secondary Use 1, Secondary Use 2) for which the user can indicate consent (e.g., by checking the checkbox, as shown with checkbox 410a) and/or indicate no consent (e.g., by not checking the checkbox, as shown with checkbox 410b).

With continued reference to FIG. 4A, dropdown menu 412 may allow selection of the duration of the consent item(s). Buttons 414a, 414b may allow the user to indicate consent (e.g., by selecting button 414a) and/or indicate no consent (e.g., by selecting button 414b) to share the consent item(s).

Figure 4B:
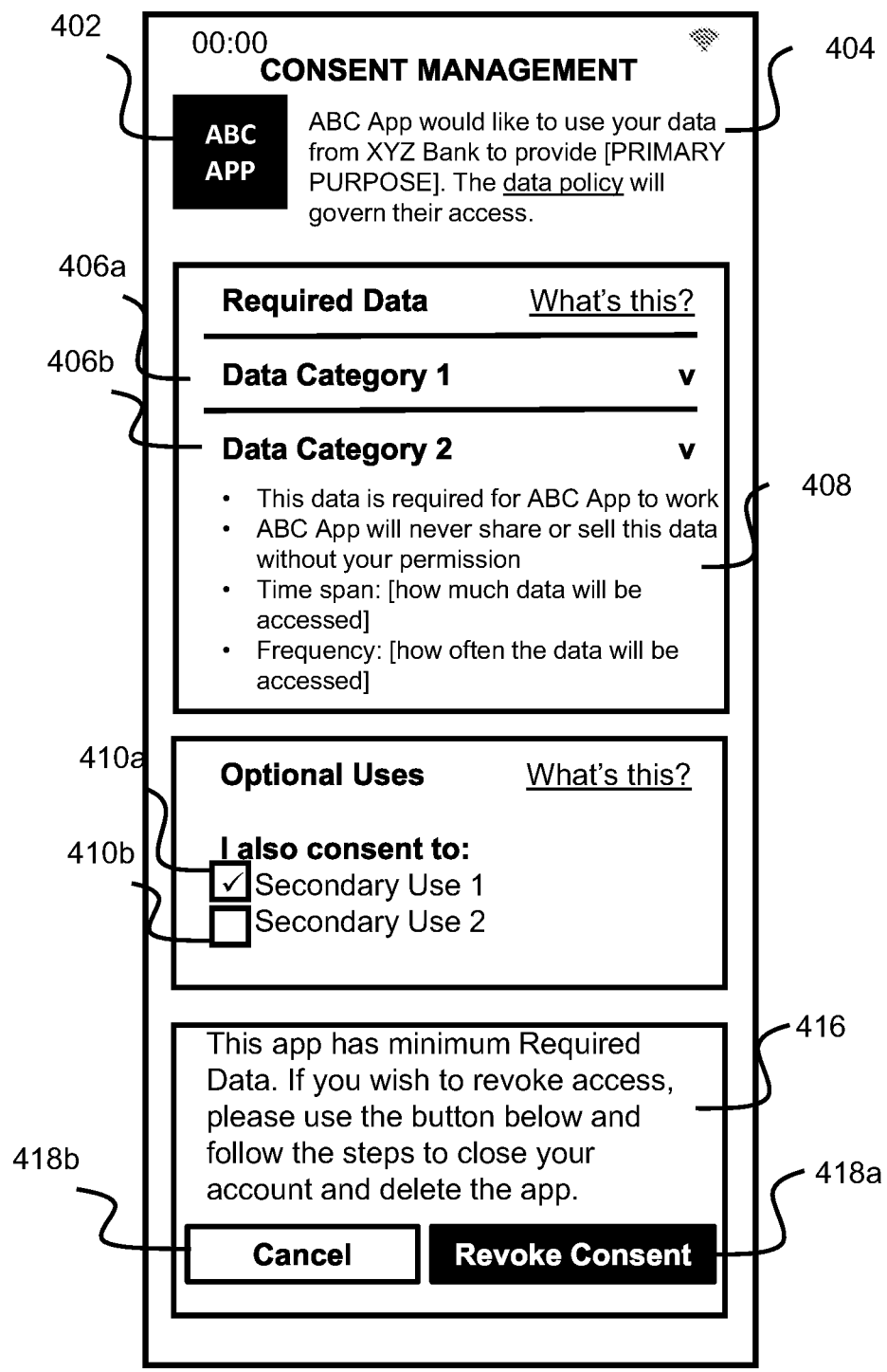

In reference to FIG. 4B, shown is an exemplary graphical user interface 400b for consent management according to non-limiting embodiments or aspects of the presently disclosed subject matter. For the purpose of illustration, the GUI 400b may be an example of a GUI to modify consent (e.g., when consent to share consent items has previously been granted).

In some non-limiting embodiments or aspects, as shown in FIG. 4B, logo 402, text 404, dropdown menus 406a, 406b, text 408, and checkboxes 410a, 410b may be the same as or similar to the description above with respect to FIG. 4A.

With continued reference to FIG. 4B, text 416 may describe the impact of modifying (e.g., revoking) consent to share the consent item(s). Buttons 418a, 418b may allow the user to select whether to modify/revoke (e.g., by selecting button 418a) and/or not to modify/revoke (e.g., by selecting button 418b) the previously granted consent.

Figure 5:
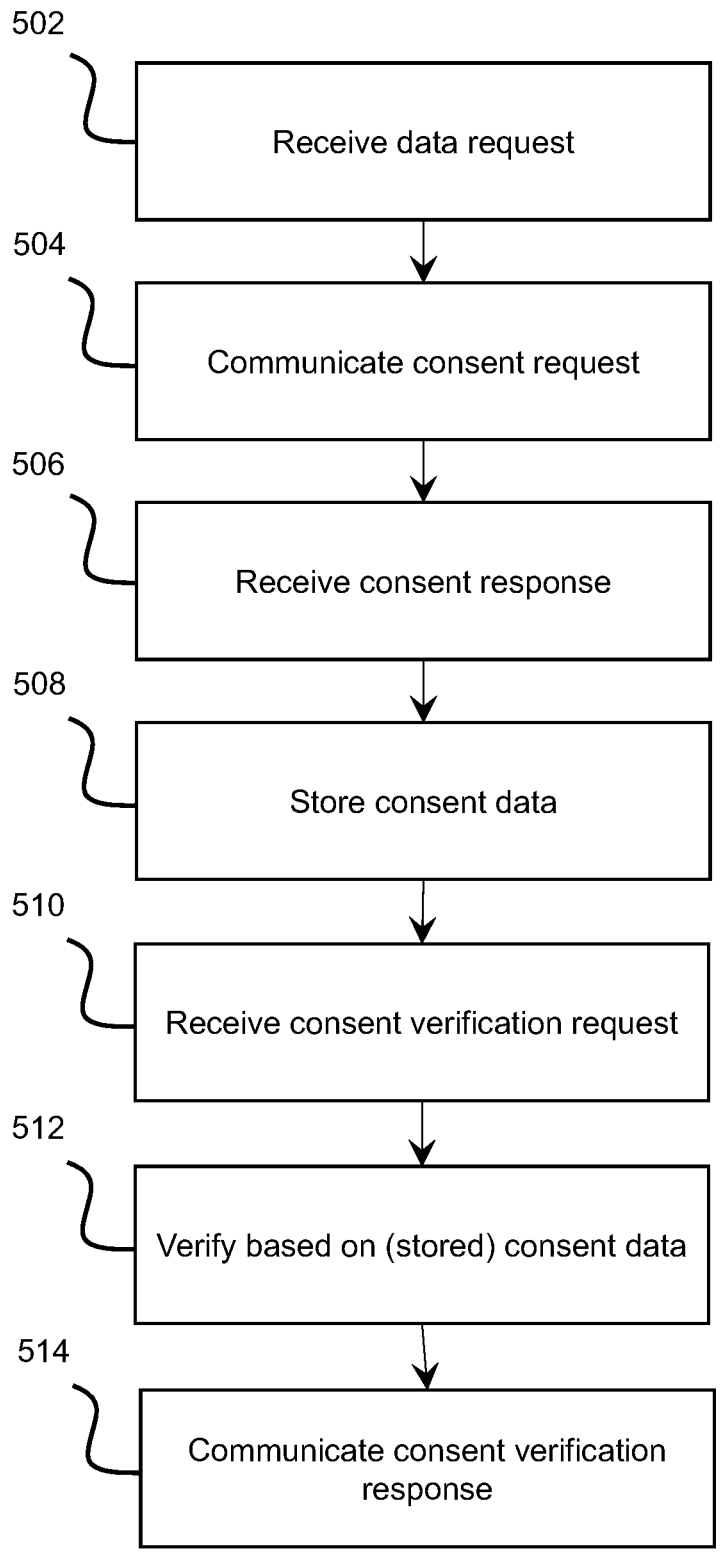
FIG. 5 is a flowchart of an exemplary process for consent management, according to non-limiting embodiments or aspects of the presently disclosed subject matter.

In reference to FIG. 5, shown is an exemplary process 500 for consent management according to non-limiting embodiments or aspects of the presently disclosed subject matter. In some non-limiting embodiments or aspects, one or more of the steps of the process 500 may be performed (e.g., completely, partially, and/or the like) by the consent database 102. In some non-limiting embodiments or aspects, one or more of the steps of the process 500 may be performed (e.g., completely, partially, and/or the like) by another system, another device, another group of systems, or another group of devices, separate from or including the consent database 102, such as the requester system 104, the user device 106, and/or the user data database 108. The steps shown in FIG. 5 are for example purposes only. It will be appreciated that additional, fewer, different, and/or a different order of steps may be used in non-limiting embodiments or aspects.

As shown in in FIG. 5, at step 502, process 500 may include receiving a data request. For example, consent database 102 may receive a first data request for user data associated with a user from a requester system 104, and the user data may be stored in a user data database 108 separate from the consent database 102, as described herein.

As shown in in FIG. 5, at step 504, process 500 may include communicating a consent request. For example, the consent database 102 may communicate a consent request to the requester system 104 for display to the user on a user device 106 associated with the user, as described herein.

As shown in in FIG. 5, at step 506, process 500 may include receiving a consent response. For example, the consent database 102 may receive a consent response from the requester system 104 based on input from the user device 106, and the consent response may indicate consent from the user to share the user data requested in the first data request, as described herein.

As shown in in FIG. 5, at step 508, process 500 may include storing consent data. For example, the consent database 102 may store consent data associated with the consent response for the user data requested in the first data request in an immutable ledger, as described herein.

As shown in in FIG. 5, at step 510, process 500 may include receiving a consent verification request. For example, the consent database 102 may receive a consent verification request from the user data database 108, and the consent verification request may be based on a second data request for the user data from the requester system 104 to the user data database 108, as described herein.

As shown in in FIG. 5, at step 512, process 500 may include verifying the verification request based on (stored) consent data. For example, the consent database 102 may verify the consent verification request based on the consent data stored in the immutable ledger, as described herein.

As shown in in FIG. 5, at step 514, process 500 may include communicating a consent verification response. For example, the consent database 102 may communicate a consent verification response based on verifying the consent verification request to the user data database 108, and the consent verification response may indicate consent from the user to share the user data from the user data database 108 with the requester system 104, as described herein.

Figure 6:
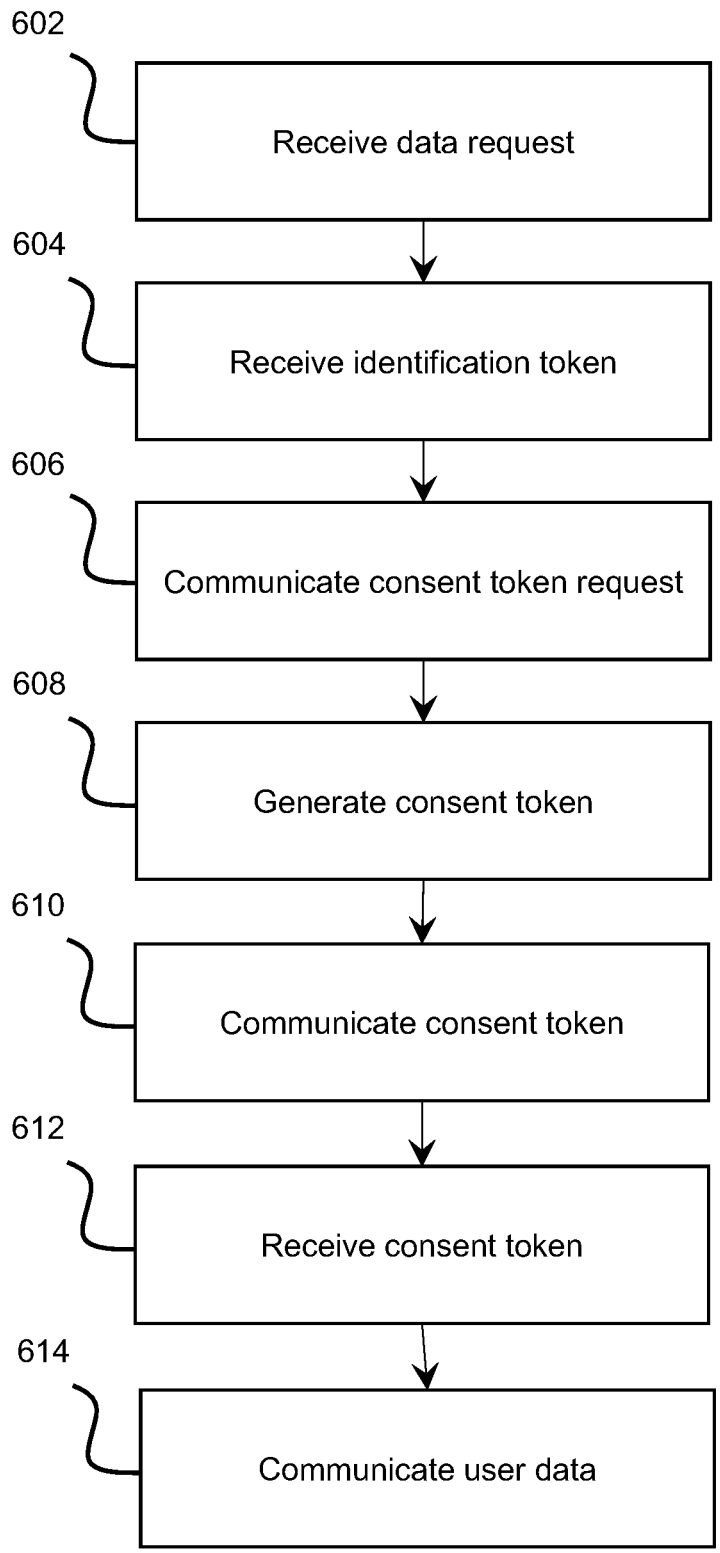
FIG. 6 is a flowchart of an exemplary process for consent management, according to non-limiting embodiments or aspects of the presently disclosed subject matter.

In reference to FIG. 6, shown is an exemplary process 600 for consent management according to non-limiting embodiments or aspects of the presently disclosed subject matter. In some non-limiting embodiments or aspects, one or more of the steps of the process 600 may be performed (e.g., completely, partially, and/or the like) by the consent service system 222. In some non-limiting embodiments or aspects, one or more of the steps of the process 600 may be performed (e.g., completely, partially, and/or the like) by another system, another device, another group of systems, or another group of devices, separate from or including the consent service system 222, such as the consent ledger system 202, the consent beneficiary system 203, the consent requester system system 208, the identity provider system 210, the consent presenter system 220, the governing authority system 224, and/or the auditor system 226. The steps shown in FIG. 6 are for example purposes only. It will be appreciated that additional, fewer, different, and/or a different order of steps may be used in non-limiting embodiments or aspects.

As shown in in FIG. 6, at step 602, process 600 may include receiving a data request. For example, a consent service system 222 may receive a data request for user data associated with a user from a consent requester system 204, as described herein. The user data may be stored in a resource provider system 208, as described herein. The data request may include a consent beneficiary system identification associated with a consent beneficiary system 203, as described herein.

As shown in in FIG. 6, at step 604, process 600 may include receiving an identification token. For example, the consent service system 222 may receive an identification token, and the identification token may authenticate an identity of the user associated with the data request, as described herein.

As shown in in FIG. 6, at step 606, process 600 may include communicating a consent token request. For example, the consent service system 222 may communicate a consent token request to a consent ledger system 202, and the consent token request may include the identification token, the beneficiary system identification, and data associated with the data request, as described herein.

As shown in in FIG. 6, at step 608, process 600 may include generating a consent token. For example, the consent ledger system 202 may generate a consent token associated with the consent token request and the user, as described herein.

As shown in in FIG. 6, at step 610, process 600 may include communicating a consent token. For example, the consent ledger system 202 may communicate the consent token to the consent requester system 204.

As shown in in FIG. 6, at step 612, process 600 may include receiving the consent token. For example, the resource provider system 208 may receive the consent token (e.g., from the consent beneficiary system 203), as described herein.

As shown in in FIG. 6, at step 614, process 600 may include communicating user data. For example, the resource provider system 208 may communicate the user data associated with the consent token to the consent beneficiary system 203, as described herein.

Although the disclosure has been described in detail for the purpose of illustration based on what is currently considered to be the most practical and preferred embodiments aspects, it is to be understood that such detail is solely for that purpose and that the disclosure is not limited to the disclosed embodiments or aspects, but, on the contrary, is intended to cover modifications and equivalent arrangements that are within the spirit and scope of the appended claims. For example, it is to be understood that the present disclosure contemplates that, to the extent possible, one or more features of any embodiment can be combined with one or more features of any other embodiment.

What is claimed is:

1. A computer-implemented method, comprising:
receiving, by a consent database, a first data request for user data associated with a user from a requester system, the user data stored in a user data database separate from the consent database;
communicating, by the consent database, a consent request to the requester system for display to the user on a user device associated with the user;
receiving, by the consent database, a consent response from the requester system based on input from the user device, the consent response indicating consent from the user to share the user data requested in the first data request;
storing, by the consent database, consent data associated with the consent response for the user data requested in the first data request;
receiving, by the consent database, a consent verification request from the user data database, the consent verification request based on a second data request for the user data from the requester system to the user data database;
verifying, by the consent database, the consent verification request based on the consent data;
communicating, by the consent database, a consent verification response based on verifying the consent verification request to the user data database, the consent verification response indicating consent from the user to share the user data from the user data database with the requester system;
receiving, by the consent database, from the requester system, utilization data associated with consented use of user data;
comparing, by the consent database, the utilization data associated with the user data with the consent data associated with the user data;
determining, by the consent database, compliance of the utilization data to conditions of the consent data;
storing, by the consent database, an indication of compliance of the utilization data;
receiving, by the consent database, an audit request associated with the user data from the user data database;
communicating, by the consent database, the indication of compliance of the utilization data associated with the user data to the user data database;
receiving, by the consent database, a revocation request of a consent associated with the user data from the user device;
updating, by the consent database, the consent response based on the revocation request; and
communicating, by the consent database, the updated consent response to the user data database.

2. The method of claim 1, further comprising:
storing, by the consent database, the consent data associated with the consent response for the user data requested in the first data request in an immutable ledger;
storing, by the consent database, the utilization data associated with the user data in the immutable ledger; and
storing, by the consent database, the indication of compliance of the utilization data in the immutable ledger.

3. The method of claim 1, further comprising:
receiving, by the consent database, from the user data database, distribution data associated with a data access of the user data from the requester system; and
storing, by the consent database, the distribution data associated with the user data in an immutable ledger.

4. The method of claim 3, further comprising:
comparing, by the consent database, the distribution data associated with the user data with the consent data associated with the user data;
determining, by the consent database, compliance of the distribution data to conditions of the consent data; and
storing, by the consent database, an indication of compliance of the distribution data in the immutable ledger.

5. The method of claim 1, wherein the first data request comprises at least one use case for the user data associated with the user from the requester system.

6. The method of claim 5, further comprising:
communicating, by the consent database, a response to the first data request to the requester system, the response indicating that the first data request is verified based on determining the at least one use case meets consent standards associated with at least one permissible use case.

7. A system for managing consent, the system comprising at least one server computer including at least one processor, the at least one server computer programmed and/or configured to:
receive a first data request for user data associated with a user from a requester system, the user data stored in a user data database separate from a consent database;
communicate a consent request to the requester system for display to the user on a user device associated with the user;
receive a consent response from the requester system based on input from the user device, the consent response indicating consent from the user to share the user data requested in the first data request;
store consent data associated with the consent response for the user data requested in the first data request;
receive a consent verification request from the user data database, the consent verification request based on a second data request for the user data from the requester system to the user data database;
verify the consent verification request based on the consent data;
communicate a consent verification response based on verifying the consent verification request to the user data database, the consent verification response indicating consent from the user to share the user data from the user data database with the requester system;
receive, from the requester system, utilization data associated with consented use of user data;
compare the utilization data associated with the user data with the consent data associated with the user data;
determine compliance of the utilization data to conditions of the consent data;
store an indication of compliance of the utilization data;
receive an audit request associated with the user data from the user data database;
communicate the indication of compliance of the utilization data associated with the user data to the user data database;
receive a revocation request of a consent associated with the user data from the user device;
update the consent response based on the revocation request; and
communicate the updated consent response to the user data database.

8. The system of claim 7, wherein the at least one server computer is programmed and/or configured to:
store the consent data associated with the consent response for the user data requested in the first data request in an immutable ledger;
store the utilization data associated with the user data in the immutable ledger; and
store the indication of compliance of the utilization data in the immutable ledger.

9. The system of claim 7, wherein the at least one server computer is programmed and/or configured to:
receive, from the user data database, distribution data associated with a data access of the user data from the requester system; and
store the distribution data associated with the user data in an immutable ledger.

10. The system of claim 9, wherein the at least one server computer is programmed and/or configured to:
compare the distribution data associated with the user data with the consent data associated with the user data;
determine compliance of the distribution data to conditions of the consent data; and
store an indication of compliance of the distribution data in the immutable ledger.

11. The system of claim 7, wherein the first data request comprises at least one use case for the user data associated with the user from the requester system.

12. The system of claim 11, wherein the at least one server computer is programmed and/or configured to:
communicate a response to the first data request to the requester system, the response indicating that the first data request is verified based on determining the at least one use case meets consent standards associated with at least one permissible use case.

13. A computer program product comprising at least one non-transitory computer-readable medium including one or more program instructions that, when executed by at least one processor, cause the at least one processor to:
receive a first data request for user data associated with a user from a requester system, the user data stored in a user data database separate from a consent database;
communicate a consent request to the requester system for display to the user on a user device associated with the user;
receive a consent response from the requester system based on input from the user device, the consent response indicating consent from the user to share the user data requested in the first data request;
store consent data associated with the consent response for the user data requested in the first data request;
receive a consent verification request from the user data database, the consent verification request based on a second data request for the user data from the requester system to the user data database;
verify the consent verification request based on the consent data;
communicate a consent verification response based on verifying the consent verification request to the user data database, the consent verification response indicating consent from the user to share the user data from the user data database with the requester system;
receive, from the requester system, utilization data associated with consented use of user data;
compare the utilization data associated with the user data with the consent data associated with the user data;
determine compliance of the utilization data to conditions of the consent data;
store an indication of compliance of the utilization data;
receive an audit request associated with the user data from the user data database;
communicate the indication of compliance of the utilization data associated with the user data to the user data database;
receive a revocation request of a consent associated with the user data from the user device;
update the consent response based on the revocation request; and
communicate the updated consent response to the user data database.

14. The computer program product of claim 13, wherein the one or more program instructions further cause the at least one processor to:

store the consent data associated with the consent response for the user data requested in the first data request in an immutable ledger;

store the utilization data associated with the user data in the immutable ledger; and store the indication of compliance of the utilization data in the immutable ledger.

15. The computer program product of claim 13, wherein the one or more program instructions further cause the at least one processor to:

receive, from the user data database, distribution data associated with a data access of the user data from the requester system; and store the distribution data associated with the user data in an immutable ledger.

16. The computer program product of claim 15, wherein the one or more program instructions further cause the at least one processor to:

compare the distribution data associated with the user data with the consent data associated with the user data;

determine compliance of the distribution data to conditions of the consent data; and store an indication of compliance of the distribution data in the immutable ledger.

17. The computer program product of claim 13, wherein the first data request comprises at least one use case for the user data associated with the user from the requester system.

18. The computer program product of claim 17, wherein the one or more program instructions further cause the at least one processor to:

communicate a response to the first data request to the requester system, the response indicating that the first data request is verified based on determining the at least one use case meets consent standards associated with at least one permissible use case.

* * * * *